US011987475B2

(12) United States Patent
Rotem

(10) Patent No.: US 11,987,475 B2
(45) Date of Patent: May 21, 2024

(54) SYSTEM AND METHOD FOR TRANSPORTING A SWAYING HOISTED LOAD

(71) Applicant: CRANE COCKPIT TECHNOLOGIES LTD., Nir Am (IL)

(72) Inventor: Noam Rotem, Rehovot (IL)

(73) Assignee: CRANE COCKPIT TECHNOLOGIES LTD., Nir Am (IL)

( * ) Notice: Subject to any disclaimer, the term of this patent is extended or adjusted under 35 U.S.C. 154(b) by 801 days.

(21) Appl. No.: 17/058,833

(22) PCT Filed: May 29, 2019

(86) PCT No.: PCT/IL2019/050613
§ 371 (c)(1),
(2) Date: Nov. 25, 2020

(87) PCT Pub. No.: WO2019/229751
PCT Pub. Date: Dec. 5, 2019

(65) Prior Publication Data

US 2021/0206605 A1 Jul. 8, 2021

Related U.S. Application Data

(60) Provisional application No. 62/677,677, filed on May 30, 2018.

(51) Int. Cl.
*B66C 13/06* (2006.01)
*B66C 13/48* (2006.01)

(52) U.S. Cl.
CPC ............ *B66C 13/063* (2013.01); *B66C 13/48* (2013.01)

(58) Field of Classification Search
CPC ........ B66C 13/06; B66C 13/063; B66C 13/48
See application file for complete search history.

(56) References Cited

U.S. PATENT DOCUMENTS 4,172,685 A * 10/1979 Nabeshima ............. B66C 13/46 414/803
5,806,696 A * 9/1998 Hytonen ................. B66C 13/54 212/270

(Continued)

*Primary Examiner* — Michael Collins
(74) *Attorney, Agent, or Firm* — Seyfarth Shaw LLP

(57) ABSTRACT

A system transports a load along a transport route, wherein the load is hoisted and kept suspended along the route. The system includes a bridge, a hoisting module hanging from the bridge, a haul mechanism, and a resource optimizer for determining an optimal-resource consumption route, including determining parameters of acceleration, deceleration, and sway-restraint maneuvers. The route is segmented, wherein a respective segment safe-travel sway-span and a respective segment hand-over sway-span are predetermined. Each segment includes an initial acceleration section, and a final deceleration section. The resource optimizer determines segment minimum resource consumption routes including determining respective parameters of acceleration, deceleration, and sway-restraint maneuvers, per the segment safe-travel sway-span and the segment hand-over sway-span, and combines possible minimum resource consumption routes, for selecting an optimal resource consuming route out of the possible minimum resource consuming routes. Transporting of the load is conducted pursuant to the optimal resource consumption route.

18 Claims, 16 Drawing Sheets

(56) References Cited

U.S. PATENT DOCUMENTS

| | | | | |
|---|---|---|---|---|
| 11,084,691 | B2 * | 8/2021 | Palberg | B66C 13/063 |
| 11,807,501 | B2 * | 11/2023 | Palberg | B66C 13/063 |
| 2013/0161279 | A1 * | 6/2013 | Schneider | B66C 13/06 212/232 |
| 2015/0329333 | A1 * | 11/2015 | Fenker | B66C 23/022 212/225 |
| 2016/0034730 | A1 * | 2/2016 | Delplace | G06K 7/10366 340/8.1 |
| 2016/0035251 | A1 * | 2/2016 | Delplace | G09B 5/065 434/66 |
| 2016/0201408 | A1 * | 7/2016 | Little | E21B 19/14 414/730 |
| 2018/0155159 | A1 * | 6/2018 | Barbet | B66C 23/905 |
| 2019/0016569 | A1 * | 1/2019 | Palberg | G05D 1/0094 |
| 2019/0112165 | A1 * | 4/2019 | Palberg | B66C 13/063 |

* cited by examiner

SYSTEM AND METHOD FOR TRANSPORTING A SWAYING HOISTED LOAD

FIELD OF THE INVENTION

The invention relates to a system and method for controlling the swaying effect associated with the movement of a hoisted load suspended from a transporting apparatus, such as a crane.

BACKGROUND OF THE INVENTION

Cranes are employed in the transport, construction, and manufacturing heavy industries for the loading and unloading, lifting and moving loads, such as freight, materials, equipment, and other objects transported from a loading point to a destination point, e.g., in manufacturing plants, construction sites and harbors. A major problem with the movement of loads from a loading point to a destination point by cranes is sway. Sway is defined as the pendulum movement of a suspended object and is created by changes in the suspended object velocity (i.e., acceleration) or in the trajectory, and from weather conditions such as wind. In the context of cranes, sway is further created due to non-optimal lifting of the object, and more particularly, hoisting a load outside its center of gravity.

Sway has a dramatical effect on the transporting of a load from a loading point to a destination point. Sway increases the "effective-volume" of the transported load, i.e., the volume that may be captured by the swaying load, requiring greater distance from obstacles, resulting in a longer transport route, thereby requiring more time and energy. At the destination point, where safe and accurate placement of the load is required, sway must be dampened to a specified limit. Customary practice teaches that swaying motion should be prevented and properly tranquilized if active, either by limiting the crane accelerations and trajectory changes or by reducing the crane movements and awaiting settlement of the load. For example, when moving a steel beam by a crane from a ground location to a destination point located in the 15th storey of a building under construction, the common practice is to undertake measures to restrain the free back-and-forth sway of the steel beam (which is typically several meters long). This sway needs to be minimized during the movement thereof in order to assure safe travel thereof and its proper unloading.

In some cases, crane operators employ maneuvers to prevent or limit the sway. For example, a tower crane can manipulate a load by its lifting and lowering with a hoisting mechanism, which can travel (by a trolley) along an upper jib, which is rotatable about the tower mast (by a slewing mechanism). When a suspended load sways, lifting of the load reduces extent of sway, trolley travel can reduce sway in parallel to the jib, and rotation of the jib can reduce sway in perpendicular to the jib. Prior art sway restraining technics are disclosed for example by Bohlke, K. A. (1995) "*Using Input Shaping to Minimize Residual Vibration in Flexible Space Structures*", (Doctoral dissertation, Massachusetts Institute of Technology); Kureck, A. (2012) "*Sway Control Technology and Its Application for Overhead Traveling Cranes*", Magnetek whitepaper; Cheng, S. Y. el al (2015), "*A Sway Reduction Controller For Construction Crane*", pp. 1-4 (Proceedings of the 32nd ISARC, Oulu, Finland); and Samin, R. E., et al (2017), "*Comparative assessment of anti-sway control strategy for tower crane system*", AIP Conference Proceedings 1883, 020035. Conventional sway reducing (anti-sway) devices are often implemented in cranes. Such devices prevent the operator controlling the crane from accelerating the load above a threshold, to thereby eliminate sway almost altogether.

SUMMARY OF THE INVENTION

In accordance with one aspect of the present invention, there is thus provided a system for transporting a load along a transport route from an uploading engagement point to a downloading disengagement point, wherein the load is hoisted and kept suspended along the route. The system includes a bridge, a hoisting module hanging down from the bridge and operative for engaging, lifting, suspending, depressing/bringing down, and disengaging the load, and a haul mechanism featuring at least one of a bridge displacer operative for displacing the bridge, and a trolley operative for travelling along the bridge, wherein the hoisting module hangs from the trolley.

The system further includes a resource optimizer for determining an optimal-resource consumption route from the uploading engagement point to the downloading disengagement point which is conducted by respective activation of said hoisting module and/or said haul mechanism, including determining respective parameters of acceleration, deceleration, and sway-restraint maneuvers along the optimal-resource consumption route. The optimal-resource consumption route is segmented into at least one segment, wherein a respective segment safe-travel sway-span and a respective segment hand-over sway-span are predetermined for each of the at least one segment, and wherein each of the at least one segment includes an initial acceleration section in which a dangling load is allowed to sway up to the respective segment safe-travel sway-span, and a final deceleration section wherein sway of the dangling load is restrained at a latter part of the respective segment for reaching the respective segment hand-over sway-span at the end of the at least one segment.

The resource may feature time, energy, system-wear, or any combination of these resources, weighted or unweighted.

The resource optimizer is operative for determining segment minimum resource consumption routes by determining for each of the at least one segment, a segment minimum resource consumption route including determining respective parameters of acceleration, deceleration, and sway-restraint maneuvers along the at least one segment, per the respective segment safe-travel sway-span and the respective segment hand-over sway-span.

The resource optimizer is further operative for combining possible minimum resource consumption routes from the segment minimum resource consumption routes, and for selecting an optimal resource consuming route out of the possible minimum resource consuming routes.

Transporting of the load from the uploading engagement point to the downloading disengagement point is conducted pursuant to the optimal resource consumption route including its respective determined parameters.

The latter part of the respective segment in which sway of the dangling load is restrained for reaching the respective segment hand-over sway-span at the end of the at least one segment, may include the end of the segment, at least a latter portion of the final deceleration section, the final deceleration section and at least a latter portion of an intermediate non-accelerating/decelerating section, and/or the final deceleration section, an intermediate non-accelerating/decelerating section, and at least a latter portion of the initial acceleration portion.

The transport route may include a 3-dimensional route. The parameters of acceleration and deceleration may be determined in 3 degrees of freedom. Sway of the dangling load at a latter part of the respective segment can be actively restrained, by application of anti-sway maneuvers.

Optionally the system, further includes a controller for controlling the transport of the load from the uploading engagement point to the downloading disengagement point, to be conducted pursuant to the optimal resource consumption route, by controlling the respective determined parameters there along. The controller may be further configured to control anti-sway maneuvers for actively restraining sway of the load.

The bridge displacer may be configured to displace the bridge by a horizontal translation, a vertical translation, a horizontal rotation, a vertical rotation, and any combination of the above.

The system may include an apparatus featuring the bridge, hoisting module, haul mechanism, bridge displacer, and/or trolley, such as a crane, a tower crane, a rotary crane, an overhead crane, a gantry crane, a luffing crane, and a telescopic crane.

In accordance with another aspect of the invention there is provided a method for transporting a load along a transport route from an uploading engagement point to a downloading disengagement point, wherein the load is hoisted and kept suspended along the route. The method includes providing a transport system, wherein the system includes a bridge, a hoisting module hanging down from the bridge and operative for engaging, lifting, suspending, depressing/bringing down, and disengaging the load, and a haul mechanism featuring at least one of: a bridge displacer operative for displacing the bridge, and a trolley operative for travelling along the bridge, wherein the hoisting module hangs from the trolley.

The method further includes optimizing resources by determining an optimal-resource consumption route from the uploading engagement point to the downloading disengagement point by respective activation of said hoisting module and/or said haul mechanism, including determining respective parameters of acceleration/deceleration, and sway-restraint maneuvers along the optimal-resource consumption route. The optimal-resource consumption route is segmented into at least one segment, wherein a respective segment safe-travel sway-span and a respective segment hand-over sway-span are predetermined for each of the at least one segment, and wherein each of the at least one segment includes an initial acceleration section in which a dangling load is allowed to sway up to the respective segment safe-travel sway-span, and a final deceleration section, and restraining of the sway of the dangling load is conducted at a latter part of the respective segment for reaching the respective segment hand-over sway-span at the end of the at least one segment.

The resource may include time, energy, system-wear, or any weighted or unweighted combination of the above resources.

The optimizing includes determining segment minimum resource consumption routes by determining for each of the at least one segment, a segment minimum resource consumption route including determining respective parameters of acceleration, deceleration, and sway-restraint maneuvers along the at least one segment, per the respective segment safe-travel sway-span and the respective segment hand-over sway-span.

The optimizing further includes combining possible minimum resource consumption routes from the segment minimum resource consumption routes.

The optimizing further includes selecting an optimal resource consuming route out of the possible minimum resource consuming routes.

The method further includes transporting the load from the uploading engagement point to the downloading disengagement point pursuant to the optimal resource consumption route, including its respective determined parameters.

The latter part of the respective segment in which sway of the dangling load is restrained for reaching the respective segment hand-over sway-span at the end of the at least one segment, may include the end of the segment, at least a latter portion of the final deceleration section, the final deceleration section and at least a latter portion of an intermediate non-accelerating/decelerating section, and/or the final deceleration section, an intermediate non-accelerating/decelerating section, and at least a latter portion of the initial acceleration portion.

The transport route may include a 3-dimensional route. The procedure of determining respective parameters of acceleration and deceleration may include determining the parameters in 3 degrees of freedom. The restraining of the sway of the dangling load may include actively restraining sway, by applying anti-sway maneuvers.

The procedure of transporting may include controlling, by a controller, the transport of the load from the uploading engagement point to the downloading disengagement point, pursuant to the optimal resource consumption route, by controlling the respective determined parameters there along. The controlling may further include controlling, by the controller, anti-sway maneuvers for actively restraining sway of the load.

The respective activation of the haul mechanism may include displacing the bridge by the bridge displacer according to at least one of: a horizontal translation, a vertical translation, a horizontal rotation, a vertical rotation, and any combination of the above.

The bridge, hoisting module, haul mechanism, bridge displacer, and/or trolley may form part of an apparatus such as a crane, a tower crane, a rotary crane, an overhead crane, a gantry crane, a luffing crane, and a telescopic crane.

BRIEF DESCRIPTION OF THE DRAWINGS

The invention may be more clearly understood upon reading of the following detailed description of non-limiting exemplary embodiments thereof, with reference to the following drawings, in which:

FIGS. 14 and 15 illustrates a double pendulum situation;

FIG. 16 exemplifies a C-space of a serial planar robot with two manifolds, demonstrating mechanical limitations modelling;

FIG. 17 is a side view of exemplary crane and building with several transport paths;

FIG. 18 illustrates fattening of obstacles by taking their Minkowski sum;

FIG. 19 is a side view demonstrating ellipsoidal effective positioning of a load along a transfer path;

FIG. 20 is a side view illustrating several randomly sampled intermediate load transfer configurations, furnished according to the invention;

FIG. 21 is a zoom-in side view of FIG. 20; and

FIG. 22 is a Dijkstra diagram used in graph theory problem solving.

Figure 1:
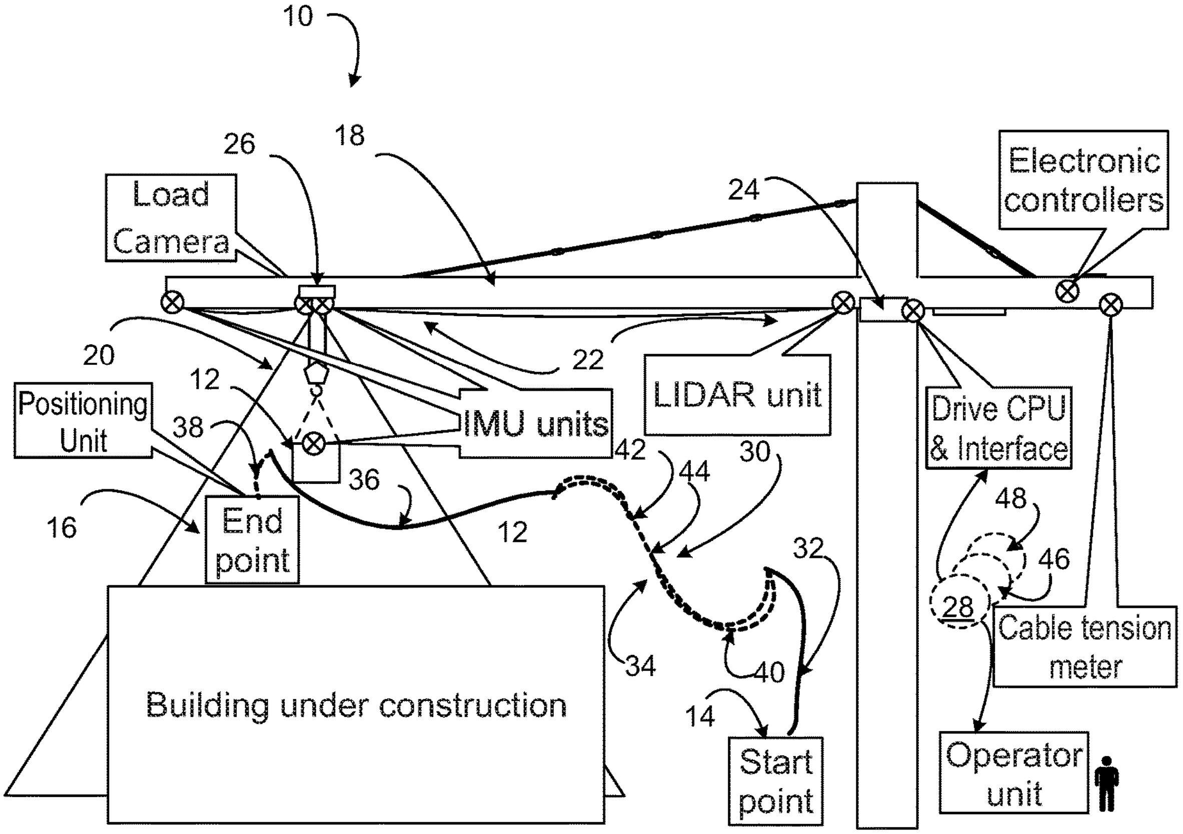
FIG. 1 is a schematic illustration of a system for transporting a load, constructed and operative in accordance with an embodiment of the invention.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

In its broadest aspects, the present invention includes a system for transporting a load along a transport route from an uploading engagement point to a downloading disengagement point, wherein the load is hoisted and kept suspended along the route. The system includes a bridge, a hoisting module hanging down from the bridge and operative for engaging, lifting, suspending, depressing/bringing down, and disengaging the load, and a haul mechanism featuring at least one of a bridge displacer operative for displacing the bridge, and a trolley operative for travelling along the bridge, wherein the hoisting module hangs from the trolley.

The system further includes a resource optimizer for determining an optimal-resource consumption route from the uploading engagement point to the downloading disengagement point which is conducted by respective activation of the hoisting module and/or the haul mechanism, including determining respective parameters of acceleration, deceleration, and sway-restraint maneuvers along the optimal-resource consumption route. The optimal-resource consumption route is segmented into at least one segment, wherein a respective segment safe-travel sway-span and a respective segment hand-over sway-span are predetermined for each of the at least one segment, and wherein each of the at least one segment includes an initial acceleration section in which a dangling load is allowed to sway up to the respective segment safe-travel sway-span, and a final deceleration section, wherein the sway of the dangling load is restrained at a latter part of the respective segment for reaching the respective segment hand-over sway-span at the end of the at least one segment.

The resource may feature time, energy, system-wear, or any combination of these resources, weighted or unweighted.

The resource optimizer is operative for determining segment minimum resource consumption routes by determining for each of the at least one segment, a segment minimum resource consumption route including determining respective parameters of acceleration, deceleration, and sway-restraint maneuvers along the at least one segment, per the respective segment safe-travel sway-span and the respective segment hand-over sway-span.

The resource optimizer is further operative for combining possible minimum resource consumption routes from the segment minimum resource consumption routes, and for selecting an optimal resource consuming route out of the possible minimum resource consuming routes.

Transporting of the load from the uploading engagement point to the downloading disengagement point is conducted pursuant to the optimal resource consumption route including its respective determined parameters.

The latter part of the respective segment in which sway of the dangling load is restrained for reaching the respective segment hand-over sway-span at the end of the at least one segment, may include the end of the segment, at least a latter portion of the final deceleration section, the final deceleration section and at least a latter portion of an intermediate non-accelerating/decelerating section, and/or the final deceleration section, an intermediate non-accelerating/decelerating section, and at least a latter portion of the initial acceleration portion.

The transport route may include a 3-dimensional route. The parameters of acceleration and deceleration may be determined in 3 degrees of freedom. Sway of the dangling load at a latter part of the respective segment can be actively restrained, by application of anti-sway maneuvers.

Optionally the system, further includes a controller for controlling the transport of the load from the uploading engagement point to the downloading disengagement point, to be conducted pursuant to the optimal resource consumption route, by controlling the respective determined parameters there along. The controller may be further configured to control anti-sway maneuvers for actively restraining sway of the load.

The bridge displacer may be configured to displace the bridge by a horizontal translation, a vertical translation, a horizontal rotation, a vertical rotation, and any combination of the above.

The system may include an apparatus featuring the bridge, hoisting module, haul mechanism, bridge displacer, and trolley, such as a crane, a tower crane, a rotary crane, an overhead crane, a gantry crane, a luffing crane, and a telescopic crane.

In accordance with other aspects, the invention features a method for transporting a load along a transport route from an uploading engagement point to a downloading disengagement point, wherein the load is hoisted and kept suspended along the route. The method includes providing a transport system, wherein the system includes a bridge, a hoisting module hanging down from the bridge and operative for engaging, lifting, suspending, depressing/bringing down, and disengaging the load, and a haul mechanism featuring at least one of: a bridge displacer operative for displacing said bridge, and a trolley operative for travelling along the bridge, wherein the hoisting module hangs from the trolley.

The method further includes optimizing resources by determining an optimal-resource consumption route from the uploading engagement point to the downloading disengagement point by respective activation of said hoisting module and/or said haul mechanism, including determining respective parameters of acceleration, deceleration, and sway-restraint maneuvers along the optimal-resource consumption route. The optimal-resource consumption route is segmented into at least one segment, wherein a respective segment safe-travel sway-span and a respective segment hand-over sway-span are predetermined for each of the at least one segment, and wherein each of the at least one segment includes an initial acceleration section in which a dangling load is allowed to sway up to the respective segment safe-travel sway-span, and a final deceleration section, and restraining of the sway of the dangling load is conducted at a latter part of the respective segment for reaching the respective segment hand-over sway-span at the end of the at least one segment.

The resource may include time, energy, system-wear, or any weighted or unweighted combination of the above resources.

The optimizing includes determining segment minimum resource consumption routes by determining for each of the at least one segment, a segment minimum resource consumption route including determining respective parameters of acceleration, deceleration, and sway-restraint maneuvers along the at least one segment, per the respective segment safe-travel sway-span and the respective segment hand-over sway-span.

The optimizing further includes combining possible minimum resource consumption routes from the segment minimum resource consumption routes.

The optimizing further includes selecting an optimal resource consuming route out of the possible minimum resource consuming routes.

The method further includes transporting the load from the uploading engagement point to the downloading disengagement point pursuant to the optimal resource consumption route, including its respective determined parameters.

The latter part of the respective segment in which sway of the dangling load is restrained for reaching the respective segment hand-over sway-span at the end of the at least one segment, may include the end of the segment, at least a latter portion of the final deceleration section, the final deceleration section and at least a latter portion of an intermediate non-accelerating/decelerating section, and/or the final deceleration section, an intermediate non-accelerating/decelerating section, and at least a latter portion of the initial acceleration portion.

The transport route may include a 3-dimensional route. The procedure of determining respective parameters of acceleration and deceleration may include determining the parameters in 3 degrees of freedom. The restraining of the sway of the dangling load may include actively restraining sway, by applying anti-sway maneuvers.

The procedure of transporting may include controlling, by a controller, the transport of the load from the uploading engagement point to the downloading disengagement point, pursuant to the optimal resource consumption route, by controlling the respective determined parameters there along. The controlling may further include controlling, by the controller, anti-sway maneuvers for actively restraining sway of the load.

The respective activation of the haul mechanism may include displacing the bridge by the bridge displacer according to at least one of: a horizontal translation, a vertical translation, a horizontal rotation, a vertical rotation, and any combination of the above.

The bridge, hoisting module, haul mechanism, bridge displacer, and/or trolley may form part of an apparatus such as a crane, a tower crane, a rotary crane, an overhead crane, a gantry crane, a luffing crane, and a telescopic crane.

Illustrative embodiments of the invention are described below. In the interest of clarity, not all features/components of an actual implementation are necessarily described. The subject matter in the present invention discloses a system and a method for controlling movements of a transport system such as a crane to transfer loads or cargos. A crane is a typical example of the transport system, and for the sake of clarity the description exemplifies the transport system in the context of a crane. According to an aspect of the invention, a loading point and a destination point are presented, and a transport route therebetween is calculated, including an acceleration/deceleration graph thereof, allowing planning the shortest applicable transport time (and/or the minimal energy consuming, and/or with minimal encumbered crane-wear) along the transport route, taking into account the sway generated along the route. In addition, the invention provides for the planning different routes, which also differ in permitted sway (i.e., sway limit as dictated by safety requirements and/or mechanical limitations of the transporting mechanism), and for selecting the optimal route among the routes, timewise, energy-wise, and/or minimal crane-wear-wise.

The loading point and the destination point may be provided by a user, or derived an automated manner by adequate pre-fed information or real time sensors. According to some aspects of the invention, a variety of sensors and signaling markers may be deployed for controlling the crane, monitoring and controlling the load, monitoring the site, providing indications for 3D model of the site, crane and load, and marking particular objects for their monitoring.

Crane movement detectors may be mounted on the jib distal edge, trolley, and hook, for indicating position and movement of these crane parts, as well as elastic deformation and vibration resulting from their movement and the sway of the load. Such sensors may be gathered in detection units which include an accelerometer, gyroscope, digital compass and a transmitter for forwarding the gathered data to the system. Load movement detectors may include a camera mounted on the trolley for imaging the load. Image analysis may allow computation of the distance of the load from the trolley, the hook, its geometric shape, its dimensions and rotation, as well as monitoring actual sway in real time for feedbacking its sway and track for correcting upcoming movement or future track planning. Load movement detectors may further include a hoisting cable tension gage mounted at the base of the drum, for measuring the load weight which can be calculated in correlation to the detected cable tension.

A Three-dimensional (3D) site monitoring may be based on LIDAR sensors mounted on the crane, which provide mapping of the working site, for creating a 3D model, and for indicating positioning of objects relative to the crane parts in real time for alerting the presence of proximate safety hazards. Crane movement in the same area allows for its repeated scanning and updating of the model. Markers, that signal the sensors particular points of interest, may be distributed in relevant locations, such as loading points, destination points, particular objects that need to be circumvented, the load, and the like.

The term "crane" used herein is exemplary and may refer to any kind of machine or transport equipment capable of lifting, lowering and moving loads by suspending the load using a cable, rope or a similar element on which the loads is hanging while being moved by the transport equipment. The technique disclosed in the subject matter is not limited to a specific type and/or design of a crane. Some examples may include: tower cranes, rotary cranes, overhead cranes, gantry cranes, luffing cranes, telescopic cranes, or any other apparatus utilized to transfer a load suspended on a cable.

The term "sway" used herein is defined as a pendulum movement from side to side (or oscillations) caused by accelerating and/or movement of the load (which may also be caused by external disturbance such as wind, or vibrations of the crane structure), while being suspended, from a bridge, jib, or any overhead crane component, by a cable, wherein the direction of movement is described, monitored and calculated in up to three axes (three dimensions).

A novel principal of the present invention is that the crane's movement is not limited to prevent sway from initiating or reduced along the entire transport route. Sway is only limited to the extent that prevents a load from hitting objects along the transport route or endanger the crane stability or compromise integrity. This ability is achieved by defining the relationship between crane movements and load sway. By allowing the crane maximum freedom of acceleration and trajectory changes, the total transport time (or energy consumption, or crane-wear) may be reduced dramatically. Additionally, the system will limit sway only at the latest point and in the minimal fashion to allow the load to be placed safely and correctly at the disengagement point when unloaded at the end of transport.

The location of obstacles in potential transport route is determined based on a 3D model of the site uploaded into the system, e.g., real-time updated details of the site such as ground topography, buildings, objects, obstacles, obstructions, crane-restricted areas (such over public roads and pavements open to pedestrians). If a relevant 3D model is not available, the system will allow a user to manually enter information defining areas forbidden for transport or areas permitted for transport. Alternatively, if no data is available, the system use a machine learning algorithm to generate and refine a basic 3D model of the site based on the repetitive movement of the crane over time. Regardless of the source for the 3D model of the site, the system will plot the most direct route possible, without hitting an obstacle for transporting the load. Once the route is generated, the system will calculate the maximum sway possible for every point on the route. The system will then generate a set of longer routs, with greater distance from obstacles, thereby allowing of increased acceleration and trajectory changes, resulting in greater sway. The system will determine the route and acceleration and deceleration graph allowing transport at the shortest transport time (or with the least dissipated energy, or with the minimal wear caused to the crane).

The term "loading point" or "engagement point" or "start point" refers to a specific area from which the load is to be loaded for transporting by the crane, or to the area where the load was handed over to the crane (i.e., tied or hanged on the hook of the crane hoisting cable. The term "destination point" or "disengagement point" or "finish point" refers to a specific area to which the load should be transported by the crane, either for unloading, or for handing-over to another carrying or transporting means. In some embodiments, the areas of the loading point and the destination point have 3-dimensional coordinates (such as latitude, longitude and altitude).

Cranes at large have a significant contribution to the productive force in a variety of industries such as construction, infrastructure, seaport, and mines factories, steel mills, foundries, ship yards, warehouses, nuclear power plants, waste recycling facilities and other industrial complexes. Efficiency of a crane is calculated from the time required to transport the load from a loading point to a destination point. Transport time is affected by the speed of load movement along the transport path, and the time required for the load to stop swaying, in particular at the unloading destination to allow safe and precise positioning of the load.

Typically, an experienced operator manually controls speed and acceleration movements from the beginning of the transport path and there along to avoid load collisions and provide minimal permitted sway upon reaching the unloading destination, as required for placing or handing-over the load. The use of automated methods (with an automated sway controller) to reduce the sway to minimum along the transport path provides some improvement over manual operation (without a sway-controller), however it is still encumbered with added consumption of precious time (relative to no-sway control at all), and thereby reduces the crane's productivity. In order to raise the crane's productivity, the present invention discloses a method and system for operating a crane without requiring to minimize the sway throughout the entire transport path.

The Sway phenomenon has limited impact when the freely dangling load is suspended in the air during transportation, provided that the load does not collide with any objects in the vicinity of the transport route and that the force exerted on the crane by the swaying load does not compromise the stability or integrity of the crane. However, sway is a major factor to be dealt with when the load is about to be placed at the unloading destination, and its restraint is called for.

Conventionally, when transporting a load (sometimes referred to as "cargo"), a crane operator limits acceleration and trajectory changes to prevent sway from initiating. Crane operators usually plan an elongated transport route, to reduce the sway of the load. For example, when moving a load (e.g., a steel beam) from a first ground location to a different ground location in a construction site, crane operators commonly pull up the load all the way up to the base of the overhead crane jib, to thereby shorten the hoisting cable and curb the possibility of sway, and only thereafter move the load in a horizontal paths. This routine extends the transport route.

If load sway occurs, the operator conventionally attempts to eliminate it by reducing the horizontal velocity of the load or by exerting movements of the load in directions opposed to the instantaneous direction of the sway. The extent an operator can counter sway depends on the skill of the operator and the response time of the crane. However, this will always take time and add significantly to a theoretical sway-free transport time. In addition, the attempts of the operator to counteract sway have a detrimental effect on the crane itself by increasing loads on the structure and mechanisms, causing increased wear to the structural elements, controls and the crane drive mechanisms.

Conventional cranes equipped with electronic drive controls, help the operator to control sway by electronically limiting acceleration. Current techniques for controlling load sway, manual or electronic, are based on the prevention or elimination of sway, by limiting crane movement along the entire transport route. Overcoming load sway, will always take time and add significantly to cycle times, " . . . sources suggest that countering sway can occupy up to 30% of the average move time. In a high speed, high pressure environment such as a process environment, the time spent on countering sway can have a significant effect on the productivity of the port and ship turnaround times", however "Load sway . . . does not always matter whilst the load is in the air . . . it becomes of great significance when the crane operator is trying to land the load accurately." (http://www.hoistmagazine.com/features/anti-sway-systems).

Accordingly, the disclosed technique herein, allows load sway along its transport in a manner limited only to the extent the sway can lead to load collision with objects, endanger crane stability, or endanger the load. A physical model serves to compute all load pendulum-like movements, along the track to the destination. Restrain of the pendulum sway is conducted only at the latter section of the transfer track, before approaching the destination, either actively (by applying anti-sway maneuvers) or passively (by letting friction to calm the sway), depending of considerations of time/energy/wear expedience.

Existing operating automation systems, mimic human operation, and move the load along a straight path as much as possible and perform relatively simple avoidance from collision with obstacles. In a challenging work environment, with multiple obstacles, speed of movement is slowed down considerably to prevent the swaying load completely, for preventing collision with obstacles. Active anti-collision systems provide an additional level of security by detecting real-time movements that can cause collision and prevent them by warning the operator or by taking over momentary control of the crane until the danger is removed. The systems are reactive to site limitations and are not involved in planning the route.

Reference is now made to FIG. 1, which is a schematic illustration of a system, designate 10, for transporting a load 12, constructed and operative in accordance with an embodiment of the invention. System 12 is designed for transporting load 12 along a transport route from an uploading engagement point 14 to a downloading disengagement point 16, wherein load 12 is hoisted and kept suspended along the route. System 12 includes a bridge 18 (e.g., a jib), a hoisting module 20 hanging down from bridge 18 and operative for engaging, lifting, suspending, depressing/bringing down, and disengaging load 12, and a haul mechanism 22 featuring at least one of a bridge displacer 24 operative for displacing bridge 18 (e.g., a slewing unit that rotates bridge 18), and a trolley 26 operative for travelling along bridge 18, wherein hoisting module 20 hangs from trolley 26. Bridge displacer 24 may be configured to displace bridge 18 by a horizontal translation, a vertical translation, a horizontal rotation, a vertical rotation, and any combination of the above.

The system further includes a resource optimizer 28 for determining an optimal-resource consumption route 30 from uploading engagement point 14 to downloading disengagement point 16. The determining is conducted by respective activation of hoisting module 20 and/or haul mechanism 22 (or any of its components—bridge displacer 24 and/or trolley 26) including determining respective parameters of acceleration, deceleration, and sway-restraint maneuvers along optimal-resource consumption route 30. Resource optimizer 28 may be located on a structural feature of the load moving elements (e.g., a cabin disposed on the mast of a tower crane) or in a remote location in communication with sensors and controllers of the moving elements. Optimal-resource consumption route 30 is segmented into at least one segment, exemplified by four consecutive segments, denoted by full line 32, dashed lines 34, full line 36, and dashed line 38, wherein a respective segment safe-travel sway-span and a respective segment hand-over sway-span are predetermined for each of the at least one segment. Each of the at least one segment, e.g., segment 34, includes an initial acceleration section, e.g., section 40 for segment 34, denoted by double dashed lines, in which dangling load 12 is allowed to sway up to the respective segment safe-travel sway-span, and a final deceleration section, e.g., section 42 for segment 34, denoted by another double dashed line, wherein the sway of the dangling load 12 is restrained at a latter part of the respective segment for reaching the respective segment hand-over sway-span at the end of the at least one segment. It is noted that an interim section, which is a non-accelerating/decelerating section, such as section 44 for segment 34, may be disposed in between the initial acceleration section (e.g., section 40) and the final deceleration section (e.g., section 42). The resource may feature time, energy, system-wear, or any combination of these resources, weighted or unweighted. Resource optimizer 28 is operative for determining segment minimum resource consumption routes by determining for each of the at least one segment, a segment minimum resource consumption route including determining respective parameters of acceleration, deceleration, and sway-restraint maneuvers along the at least one segment, per the respective segment safe-travel sway-span and the respective segment hand-over sway-span. Resource optimizer 28 is further operative for combining possible minimum resource consumption routes from the segment minimum resource consumption routes, and for selecting an optimal resource consuming route 30 out of the possible minimum resource consuming routes.

Transporting of load 12 from uploading engagement point 14 to downloading disengagement point 16 is conducted pursuant to optimal resource consumption route 30 including its respective determined parameters.

The latter part of the respective segment in which sway of the dangling load 12 is restrained for reaching the respective segment hand-over sway-span at the end of the at least one segment, may include the end of the segment (e.g., at the end of segment 34), at least a latter portion of the final deceleration section (e.g., of section 42), the final deceleration section and at least a latter portion of an intermediate non-accelerating/decelerating section (e.g., section 42 and a latter portion of section 44), and/or the final deceleration section, an intermediate non-accelerating/decelerating section, and at least a latter portion of the initial acceleration portion (e.g., sections 42 and 44 and a latter portion of section 40).

Transport route 30 may include a 3-dimensional route. The parameters of acceleration and deceleration may be determined in 3 degrees of freedom. Sway of the dangling load 12 at a latter part of the respective segment can be actively restrained, by application of anti-sway maneuvers.

Optionally the system, further includes a controller 46 for controlling the transport of load 12 from uploading engagement point 14 to downloading disengagement point 16, to be conducted pursuant to optimal resource consumption route 30, by controlling the respective determined parameters there along. Controller 46, or another controller 48, may be further configured to control anti-sway maneuvers for actively restraining sway of load 12. Controller 46, or controller 48, may be located on a structural feature of the load moving elements (e.g., a cabin disposed on the mast of a tower crane) or in a remote location in communication with sensors and controllers of the moving elements.

Figure 2:
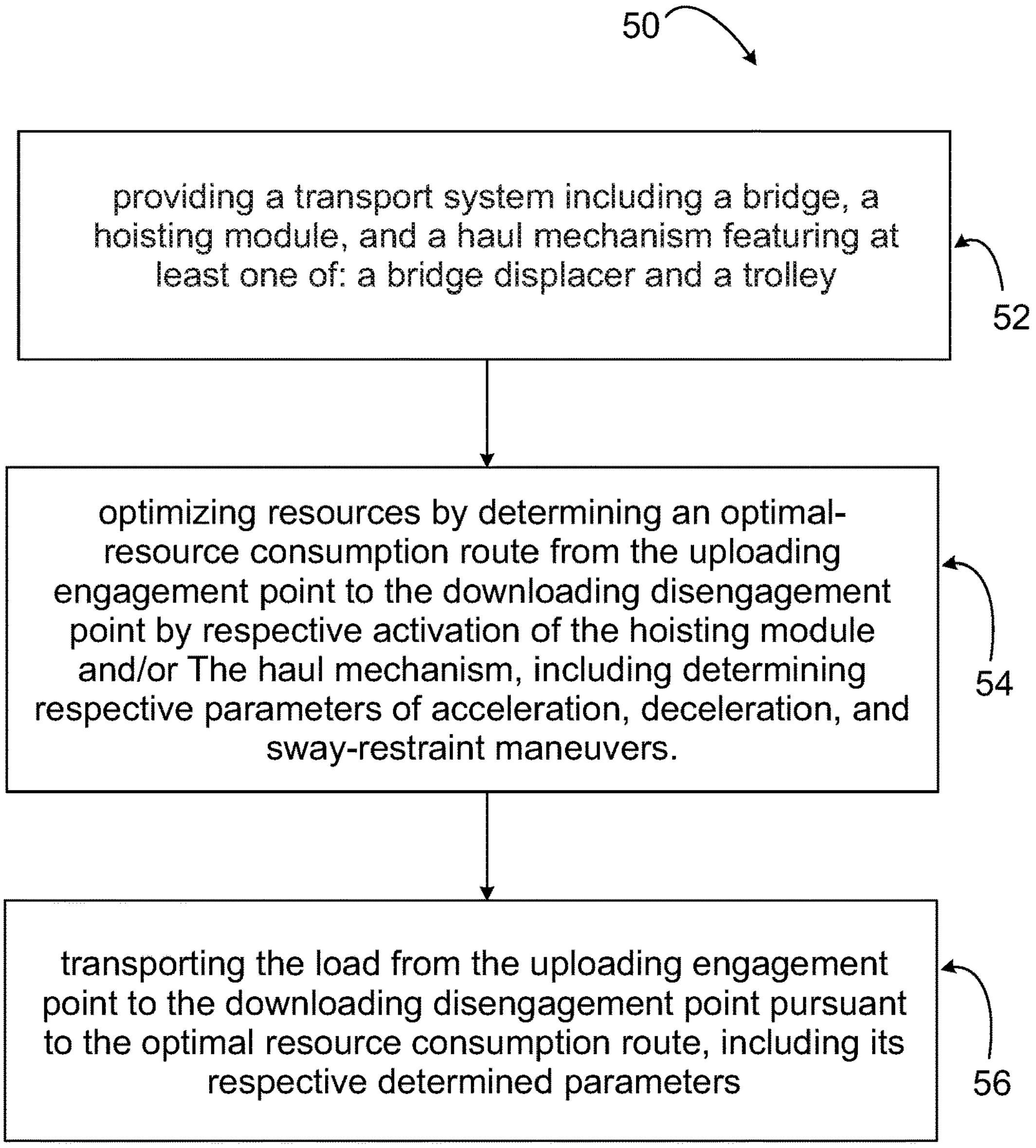
FIG. 2 is a block diagram of a method for transporting a load, operative in accordance with the present invention.

Reference is now made to FIG. 2, which is a block diagram of a method 50 for transporting a load, operative in accordance with the present invention. The load is transported according to method 50 along a transport route from an uploading engagement point to a downloading disengagement point, wherein the load is hoisted and kept suspended along the route. In procedure 52 of method 50, transport system is provided, wherein the system includes a bridge, a hoisting module hanging down from the bridge and operative for engaging, lifting, suspending, depressing/bringing down, and disengaging the load, and a haul mechanism featuring at least one of: a bridge displacer operative for displacing said bridge, and a trolley operative for travelling along the bridge, wherein the hoisting module hangs from the trolley.

In procedure 54, resources are optimized by determining an optimal-resource consumption route from the uploading engagement point to the downloading disengagement point by respective activation of the hoisting module and/or the haul mechanism, including determining respective parameters of acceleration, deceleration, and sway-restraint maneuvers along the optimal-resource consumption route. The optimal-resource consumption route is segmented into at least one segment, wherein a respective segment safe-travel sway-span and a respective segment hand-over sway-span are predetermined for each of the at least one segment, and wherein each of the at least one segment includes an initial acceleration section in which a dangling load is allowed to sway up to the respective segment safe-travel sway-span, and a final deceleration section, and restraining of the sway of the dangling load is conducted at a latter part of the respective segment for reaching the respective segment hand-over sway-span at the end of the at least one segment. The resource may include time, energy, system-wear, or any weighted or unweighted combination of the above resources.

Procedure 54 of optimizing includes determining segment minimum resource consumption routes by determining for each of the at least one segment, a segment minimum resource consumption route including determining respective parameters of acceleration, deceleration, and sway-restraint maneuvers along the at least one segment, per the respective segment safe-travel sway-span and the respective segment hand-over sway-span.

Procedure 54 of optimizing further includes combining possible minimum resource consumption routes from the segment minimum resource consumption routes.

Procedure 54 of optimizing further includes selecting an optimal resource consuming route out of the possible minimum resource consuming routes.

In procedure 56 the load is transported from the uploading engagement point to the downloading disengagement point pursuant to the optimal resource consumption route, including its respective determined parameters.

Procedure 56 of transporting may include controlling, by a controller, the transport of the load from the uploading engagement point to the downloading disengagement point, pursuant to the optimal resource consumption route, by controlling the respective determined parameters there along. The controlling may further include controlling, by the controller, anti-sway maneuvers for actively restraining sway of the load.

Figure 3:
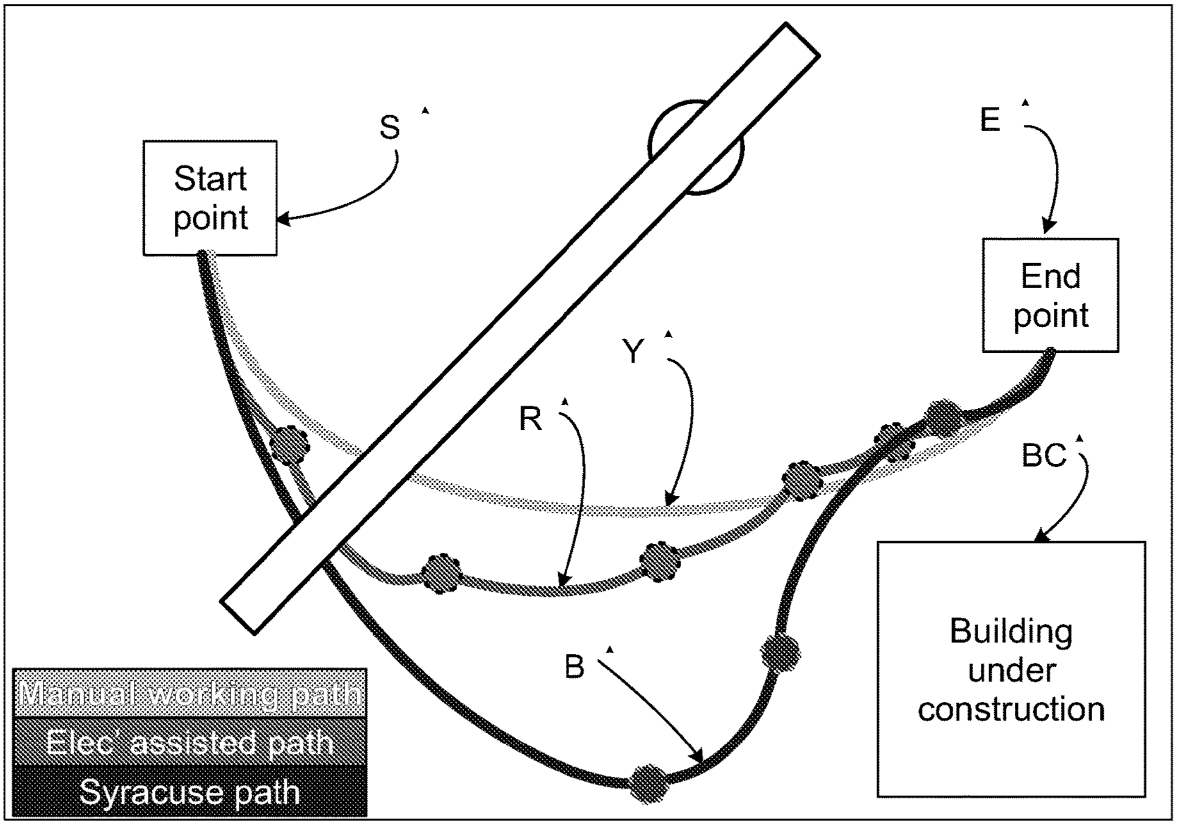
FIG. 3 is a top view of a site in which tower crane can move a load, from a start point to an end point, through several possible exemplary trajectories or paths.
Figure 4:
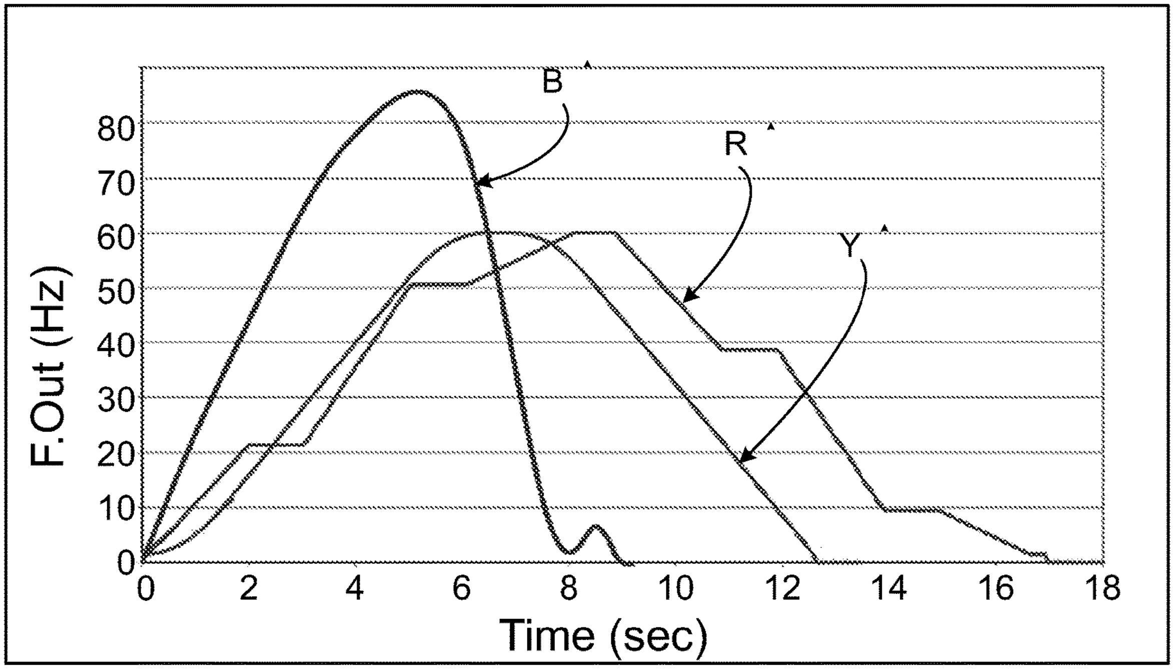
FIG. 4, is a chart of the velocity of the load as a function of time, for the paths of FIG. 3.

Reference is now made to FIGS. 3 and 4. FIG. 3 is a top view of a site in which tower crane T can move a load from a start point S to an end point E, through several possible exemplary trajectories or paths. For simplifying explanation, the movement is purely horizontal, without lifting or lowering of the load (e.g., no change to the hoisting cable length of a crane). FIG. 4 is a chart of the velocity of the load as a function of time, for the paths of FIG. 3. Trajectory R exemplifies a human controlled trajectory, without any assistance for track planning. The operator moves the load along trajectory R with minimal acceleration for the sake of limiting the sway of the load to a minimum. The trajectory is segmented into several arcuate segments which abruptly commence at a different direction relative to the former segment, as the load is initially accelerated at the beginning of each segment along the first section of each segment and then slows down or remains at constant velocity, while the direction of motion is gradually altered for avoiding collision with a nearby building under construction BC. The overall time spent for path R is the greatest of all paths.

Trajectory Y exemplifies a human controlled trajectory, with the assistance of an electronic sway limiting assistance system. The assistance system limits acceleration along the entire trajectory for limiting sway, and the operator simply controls the direction of load movement appearing as a smooth arcuate path, without sudden initiations of acceleration/deceleration—which are fully administered by the assistance system. The maximum velocity of the load along paths R and Y is similar. The overall time spent for path Y is slightly reduced in comparison with that of path R.

Trajectory B exemplifies a fully controlled trajectory, controlled by a system constructed and operative in accordance with the invention. The trajectory is segmented into several arcuate segments which commence at a somewhat different direction relative to the former segment, as the load is accelerated to the maximum allowed acceleration along most of the way, if not all the way, along of each segment, and slows down only toward the end of the segment before handing over to a new segment in which the load is accelerated again but in a different direction. In this example, the overall velocity—regardless of direction, continuously increases along the former part of path B and reaches a significantly higher maximum in comparison to R and Y paths, and decreases along the latter part of path B (the small acceleration toward the end is a sway restraint maneuver). Slowing down along path B is performed only for the sake of avoiding collisions with object (building BLD) and reaching the end point. The overall time spent for path B is the smallest of all paths.

Planning a Route According to the Site's Limitations

Figure 5:
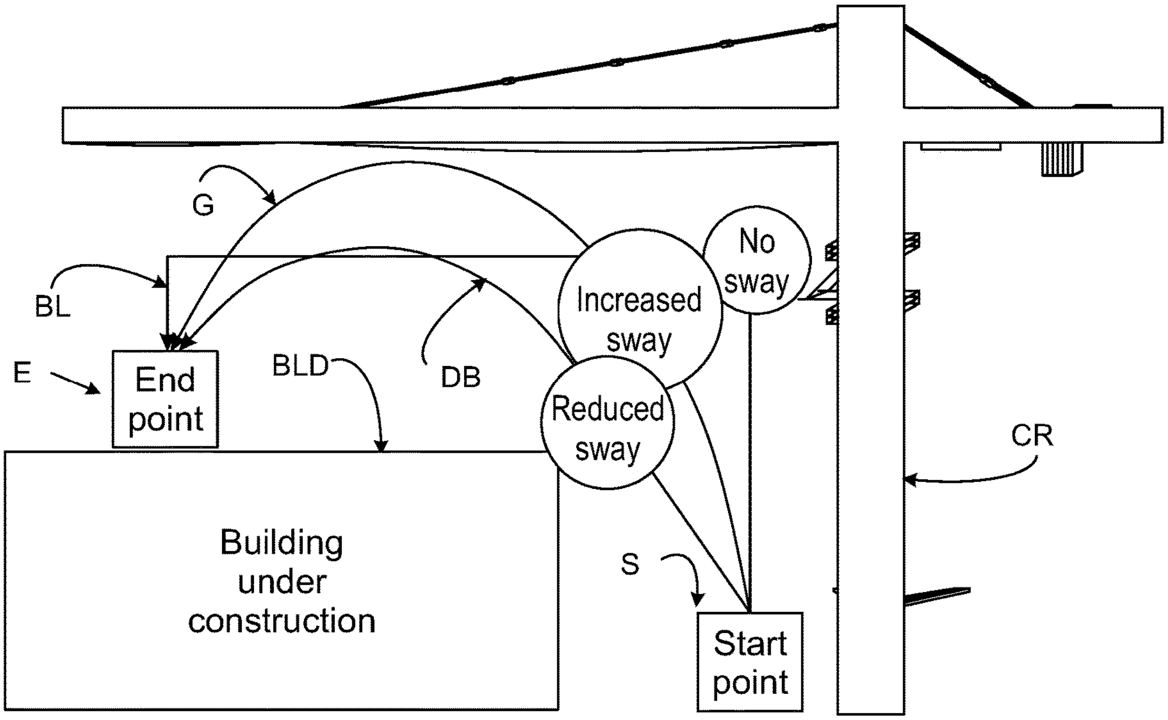
FIG. 5 is a side view of a tower crane and a building, exemplifying possible paths in a vertical plane for transferring a load from a start point to and end point.
Figure 6:
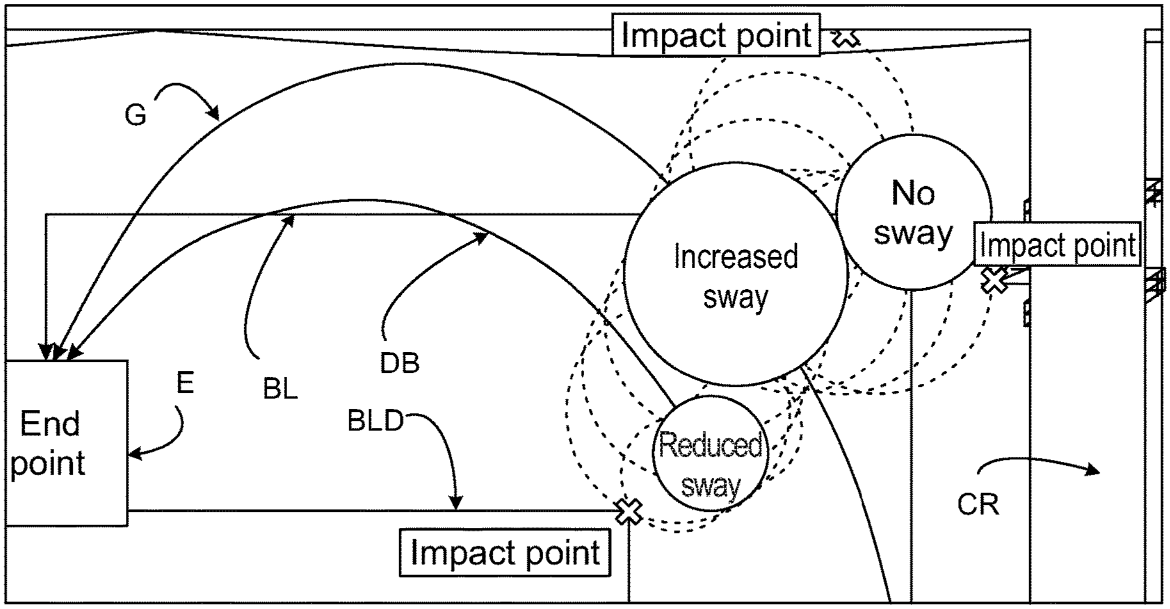
FIG. 6 is a zoom in view detailing impact points for different sways in different paths, in which the volume assumed by the load sways to extend into further locations.

Reference is now made to FIGS. 5 and 6. FIG. 5 is a side view of a tower crane CR and a building BLD exemplifying possible paths in a vertical plane for transferring a load from a start point S to an end point E. FIG. 6 is a zoom in view detailing impact points for different sways in different paths, in which the volume assumed by the load sways to extend into further locations.

Path BL demonstrates human controlled crane movement with the assistance of an electronic assistance system. In this path the operator selects the path, usually at one degree of freedom—in this case at vertical directions (hoist up, horizontal propagation, lower down). The assistance system automatically limits the acceleration of the load to a minimum throughout the entire path, in order to restrain the sway to almost "no sway", allowing smooth acceleration. The elastic distortion experienced by the crane is close to zero. The effective size in space assumed by the almost non-swaying load is very similar to the physical size of the load.

Path BL requires the load to travel a long distance at a slow average speed, thereby increasing the total transport time, however some time is reduced due to the fact that no sway elimination is needed at the end of the transport.

Path DB demonstrates one possible movement controlled by a system constructed and operative in accordance with the invention. The system examines a path of movement which allows closer approach to obstacles (with up to three degrees of freedom, according to an optimal calculation), assuming a reduced sway. The system considers the load to assume a somewhat larger volume in space according to the allowed reduced sway, represented by the side balloons in proximity of impact points—in this case the corner of building BLD. In this path, the elastic distortion experienced by the crane is small, adding some load sway. The effective size of the load is somewhat larger relative to its physical size, due to its limited sway.

Path DB requires the load to travel a short distance at a faster average speed than Path BL, thereby reducing the total transport time, however some time is added compered to Path BL due to the fact that some sway elimination is needed at the end of the transport.

Path G demonstrates another possible movement controlled by a system constructed and operative in accordance with the invention. Here the system examines a path which keeps the load as far as possible from obstacles (with up to three degrees of freedom, according to an optimal calculation), allowing maximal sway. The system considers the load to assume a substantially larger volume in space according to the allowed maximal sway, represented by the side balloons in proximity of impact points—in this case the corner of building BLD, the bottom of the jib of crane CR, and the side of the tower mast. In this path, the elastic distortion experienced by crane CR is large, adding significant load sway. The effective size of the load is substantially larger relative to its physical size, due to its increased sway.

Path G requires the load to travel a distance shorter than Path BL but longer than Path DB at the fastest average speed. Some time is added due to the fact that significant sway elimination is needed at the end of the transport.

The system will select the preferable path with the minimal time/energy/crane-wear.

Existing operating-automation systems do not attribute much importance to the mechanical limitations of the crane, because they mimic the operation of a human operator and do not take advantage of the maximum mechanical capabilities of the crane in terms of acceleration, degrees of freedom of movement, or mechanical endurance. The present invention plans the course of movement to the extent limited only by mechanical limitations of the crane, e.g., range of motion, acceleration, loading capacity and elastic distortion of the crane body, which are allowed to be exhausted. As part of the system integration process, the mechanical capabilities of the crane are studied using the crane control system and the load control system (sensors installed on the crane) and a physical model that calculates the crane's capabilities and the elastic deformation of the crane body. The mechanical limitations of the crane are expressed in the system, similar to physical obstacles, by acceleration which cannot be exceeded.

The existence of structural deformation in tower cranes is evident. The types of deformation in tower cranes are divided modes: the first mode is dominated by the deformation of the jib structure, while the second and the third modes are predominantly the complex bending patterns of the whole crane structure.

Twist of the jib structure is found in the fourth mode. (JU F. et al, "*Dynamic response of tower crane induced by the pendulum motion of the payload*", International Journal of Solids and Structures 43 (2006) 376-389 (https://www-.sciencedirect.com/science/article/pii/S0020768305001885).

Figure 7:
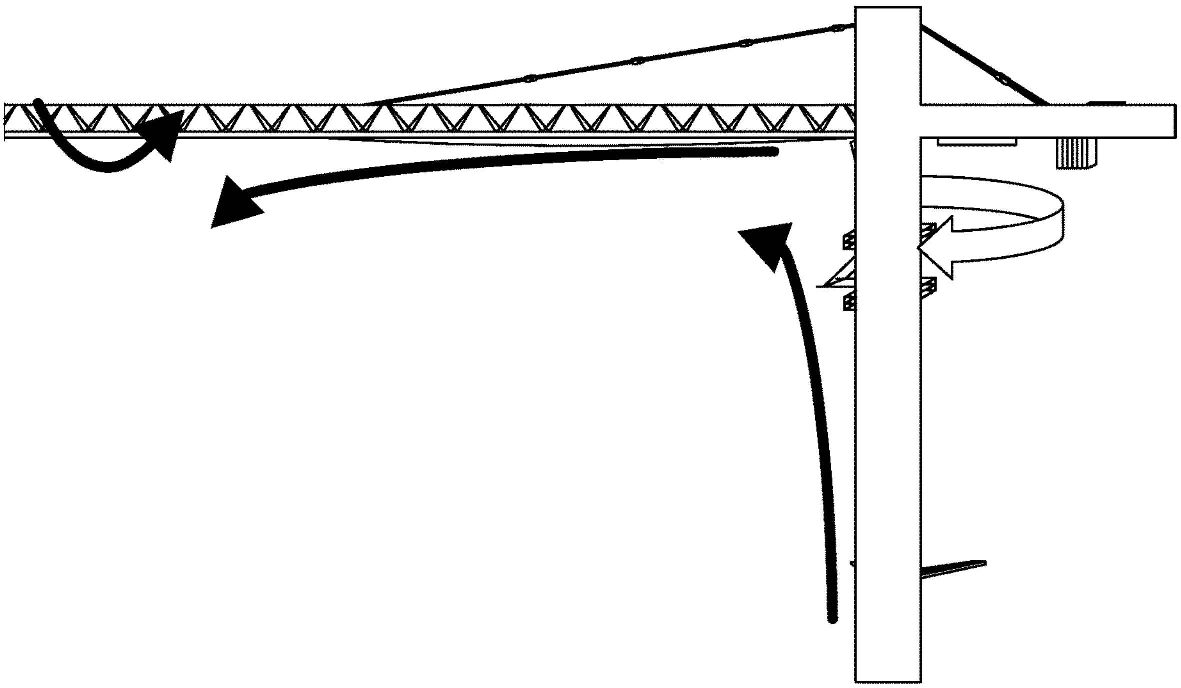
FIG. 7 demonstrates crane deformation and differential load carrying capacity.

Reference is now made to FIG. 7, which demonstrates crane deformation and differential load carrying capacity. Planning a route according to the mechanical limitations of the crane takes into accounts four possible elastic deformations of the crane deformation, represented by the arrows shown in FIG. 7. The load carrying capacity of the jib decreases, the farther away from the mast the hanging load is disposed, as represented by the shading gradient of the jib in FIG. 7.

Planning a route according to load parameters takes into account the shape of the load and its center of gravity, which significantly affect the pendulum movement and can cause a spiral movement of the load around itself during the swing. Existing operating automation systems minimize the impact of the load shape and location of its center of gravity by slowing down motion and restraining the sway of the load, but at the expense extending the movement time. The present invention provides for continuously monitoring load geometry and its location with a camera and further allows to calculate the weight of the load using a component measures the tension of the load hoisting cable. Load data is used to plan the route and update the route on the move.

Figure 8:
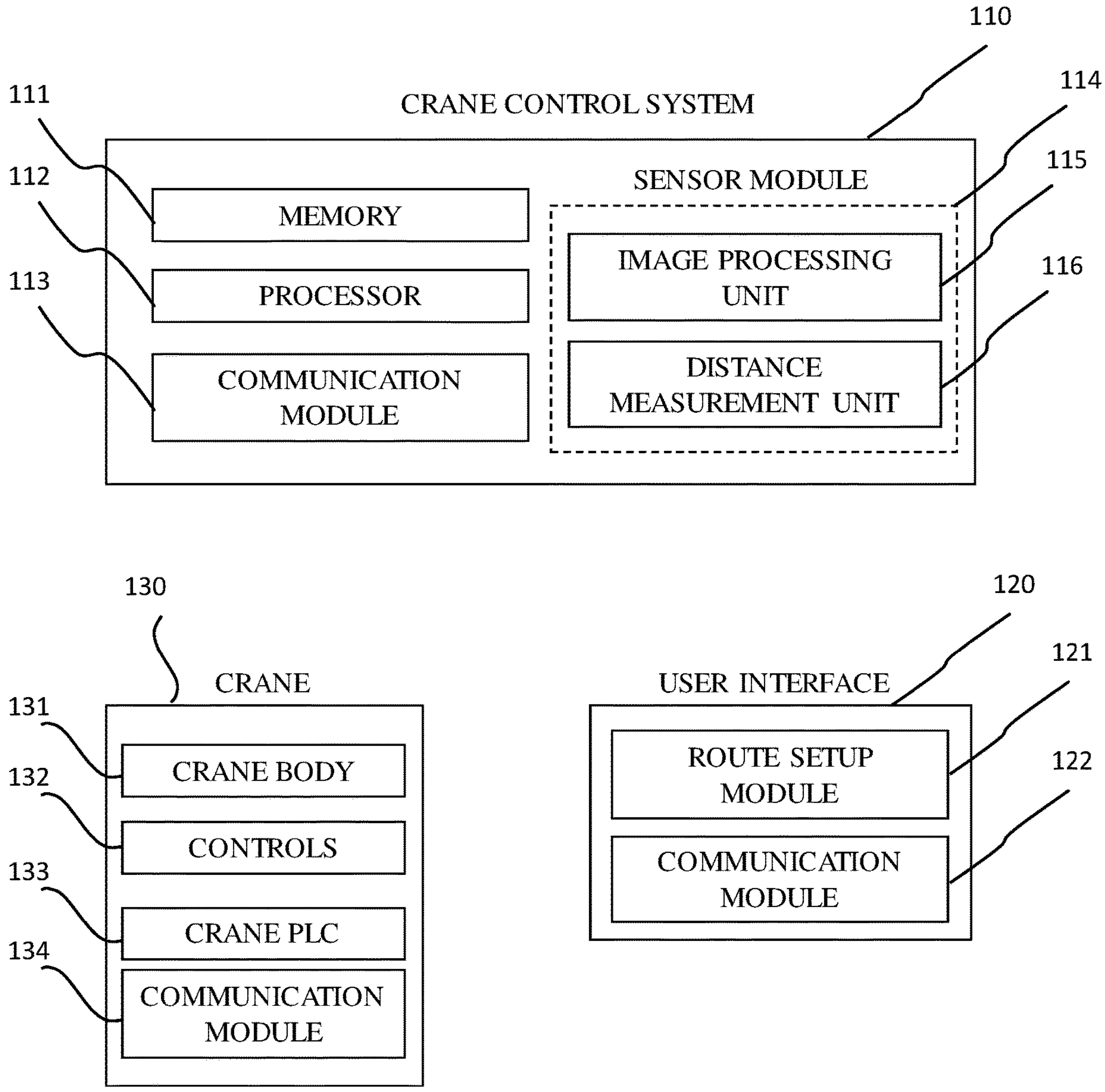
FIG. 8 is a block diagram of a system for transporting a load, constructed and operative according to exemplary embodiments of the subject matter of the invention.

Reference is now made to FIGS. 8 to 13. FIG. 8 illustrates a system for transporting a load, constructed and operative according to exemplary embodiments of the subject matter of the invention. In FIG. 8, a crane control system 110 is configured to receive data respective of the load's loading point and destination point, and to calculate and transmit a route to a crane 130. Such data may be inputted via a user interface 120. The calculated route may be calculated based on load's loading point and destination point, the crane specifications, the load data (dimensions, weight, shape, contents, etc.), and in some embodiments—a 3D model of the area around the crane 130, or along the route.

Crane control system 110 includes a processor 111, a memory 112, a communication module 113 and a sensor module 114. Processor 111 is configured to receive data arriving from memory 112, communication module 113 and sensor module 114 and to calculate a route for transporting the load. In this context, the term sensor "module" 114 references conceptual grouping, namely—incorporating all sorts of sensors that may be deployed without requiring a linkage to one another. Memory 112 is configured to store data previously received by communication module 113, calculated routes (either new or old), and specifications of crane 130. Additionally, memory 112 is configured to store safety regulations, and limiting rules to be applied to the calculated route. Communication module 113 is configured to exchange data with user interface 120, crane control system 110, crane 130 (and its operator, which may be the user), and in some embodiments, with a remote server (not shown).

Sensor module 114 includes a plurality of sensors. In some embodiments the sensors of sensor module 114 are configured to collect data about the actual sway generated by or affecting the load. In some cases, the data about the sway may include radius of sway, altitude differences at the extreme points of sway, and the like. In further embodiments, the sensor measurements of the load sway (and/or cable sway) may be taken by image processing unit 115. Additionally, sensor module 114 may be configured to frequently measure the distance from the load to objects which are detected by the sensors. The distance measurements are transmitted (e.g., via communication module 113) to processor 111 for processing.

In other embodiments, the sensors of sensor module 114 are configured to collect data about the surrounding area of the load and/or the crane 130. In some embodiments, sensor module 114 comprises image processing unit 115 and a distance measurement unit 116. In some embodiments, sensor module 114 is configured to collect data about the load to be connected to crane 130 prior to lifting of the load.

In an exemplary embodiment of the present invention, sensor module 114 is configured to measure the distances to objects in the operational zone of the crane 130 and to generate a 3D model of that operational zone. In other embodiments, the sensor module may be configured to verify the correctness of an existing 3D model which is stored in memory 112 of crane control system 110, which may be updated and rectified by processor 111, according to the updated readings of the sensors.

In yet another embodiment, sensor module 114 is configured to collect data about the operational zone surrounding of the crane 130. In further embodiments, the sensor module 114 is configured to update a 3D model of the operational zone surrounding the crane. For example, the sensor module 114 may update the model when another storey is added to a building undergoing construction.

User interface 120 may be a device used by a person operating crane 130. In some embodiments, user interface 120 may be used by a crane operator, operating the movements of the crane from an operating cabin disposed on the crane, or by another person controlling the crane 130 from a remote control. In some embodiments, user interface 120 includes a route setup module 121 and a communication module 122 configured to exchange data with crane control system 110. In some embodiments, route setup module 121 allows a user controlling user interface 120 to mark a loading point and a destination point, for example by using a human interface such as a cursor, keyboard, touch screen, mouse and the like. User interface 120 is configured to receive a load movement request having the loading point and the destination point, and transmits the load movement request to crane control system 110. User interface 120 may also be used to update crane control system 110 with any change in either one of the points (loading, destination) or in the environmental conditions (such as wind strength). In some embodiments, the load movement request further features a load information (e.g., weight, shape, dimensions, center of gravity, fragility, contents, hauling liquid—and whether in an open vessel).

In some embodiments, the user may define through user interface 120 an obstruction free corridor, namely—without obstructing objects that would limit the safe sway of the load. The obstruction free corridor is a space defined by at least two virtual walls configured by a user, that crane control system 110 may treat as actual walls for the purpose of calculating routes. In such cases crane control system 110 may calculate the route to be situated inside the obstruction free corridor, between the virtual walls.

Crane 130 includes a crane body 131, which is configured to transport a load from a loading point to a destination point. Crane 130 further includes controls 132 for controlling the movements of crane body 131, by an operator. In some embodiments, crane 130 is operated manually or semi-manually and controls 132 are physical, e.g., hand operated handles, driving wheels, knobs, grips, and shafts, or other human interface means (Remote control, keyboard, mouse and the like). In other embodiments, crane 130 may be operated automatically and controls 132 may be implemented as a computer program instead of a physical/human interface control mechanism. Crane 130 may also comprise a communication module 134 configured to exchange signals with another entity, for example user interface 120 and/or crane control system 110.

Figure 9:
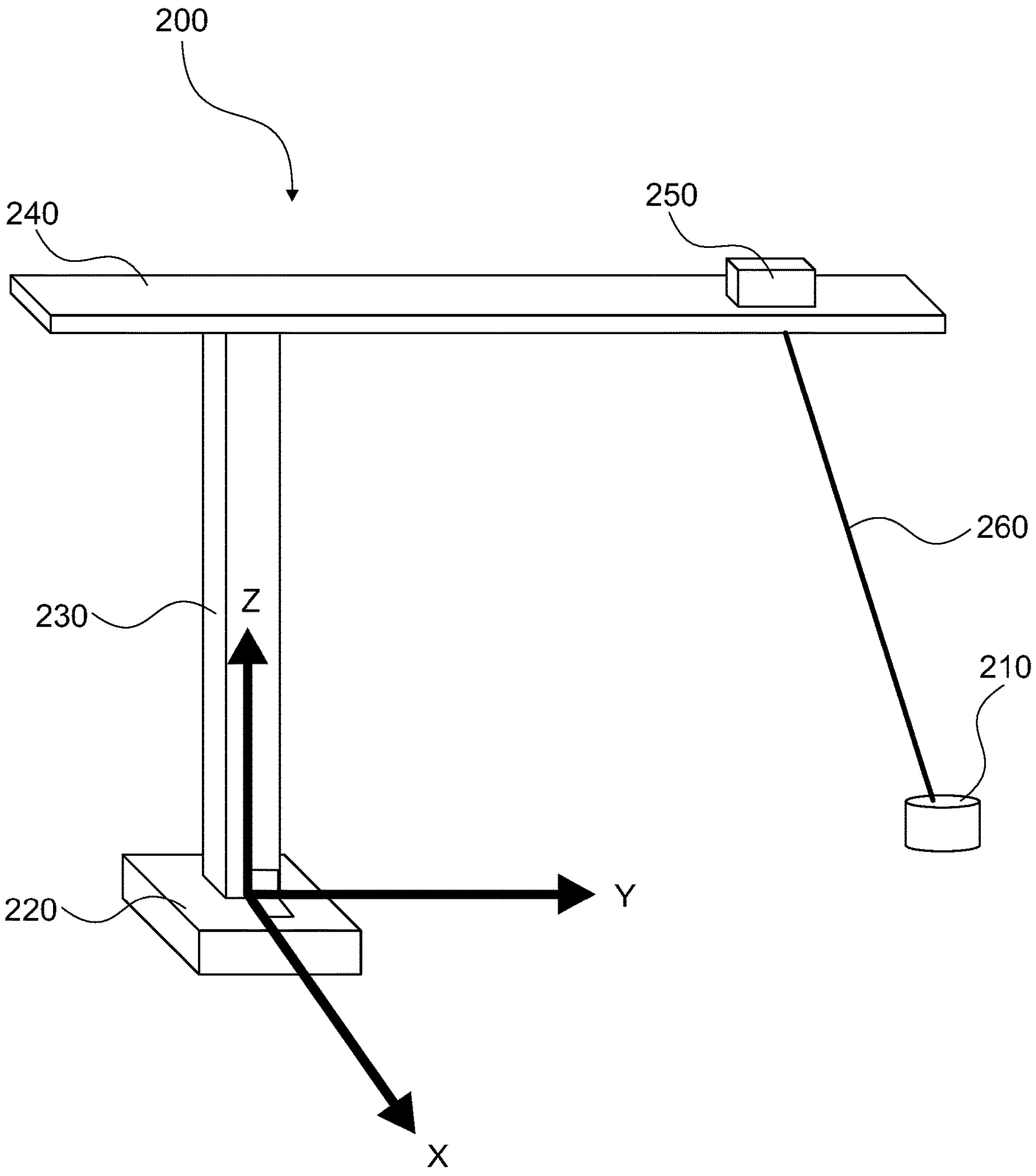
FIG. 9 illustrates a simplified structure of a crane, constructed and operative according to exemplary embodiments of the subject matter of the invention.

Reference is now made to FIG. 9. FIG. 9 illustrates a simplified structure of a crane, constructed and operative according to exemplary embodiments of the subject matter of the invention. FIG. 9 shows a tower crane 200 carrying a load 210, which in this embodiment is suspended in the air. Although the crane described herein is a tower crane, any other crane may also be used, and the tower cane configuration is described herein in a non-limiting manner. Tower crane 200 includes a base 220, a tower mast 230, a jib 240, and a trolley 250. Base 220 and tower mast 230 are typically fixed to the ground using weights, and serve as the anchor of tower crane 200 for its stabilization while hoisting and carrying loads. Jib 240 is installed on tower mast 230 and is configured to rotate horizontally around the tower mast 230 (e.g., by a suitable slewing unit). Trolley 250 is disposed in jib 240 (usually at the bottom of jib 240) and is configured to travel there along. Hoisting cable 260 dangles down from trolley 250, and a load 210 is hangs to the bottom of cable 240, typically by means of a hook (not shown). Typically, trolley 250 comprises a cable control mechanism (not shown) with a cable 260 attached thereto. The cable control mechanism is configured to pull up or release down cable 260, thus lifting or descending cable 260. Therefore, tower crane 200 is configured to control the movement of the cable 260 and load 210, which is attached thereto in all directions, which may be described in three dimensions. For example, movements along the Y axis are caused by the movement of trolley 250 along jib 240, movements along the X axis are caused by the horizontal rotation of jib 240 (such rotation has also an X component) and movements along the Z axis are caused by the cable control mechanism pulling or releasing cable 260.

By moving in these 3 axes, tower crane 200 defines an operation area roughly confined by a cylinder, whose radius is determined by the length of jib 240, where trolley 250 may move (the longer the cable 260 is, the farther the load can sway, and the swaying volume is therefore defined by a conical frustum rather than a cylinder). Thus, tower crane 200 may be positioned to place the cable 260, which is attached to trolley 250, at any point within the operation area.

In some embodiments, the crane further comprises a control chamber (not shown) designed to house an operator controlling the tower crane 200. In further embodiments, the control chamber comprises the tower crane control mechanism, and crane control system interface, which is configured to present data to the operator.

Figure 10:
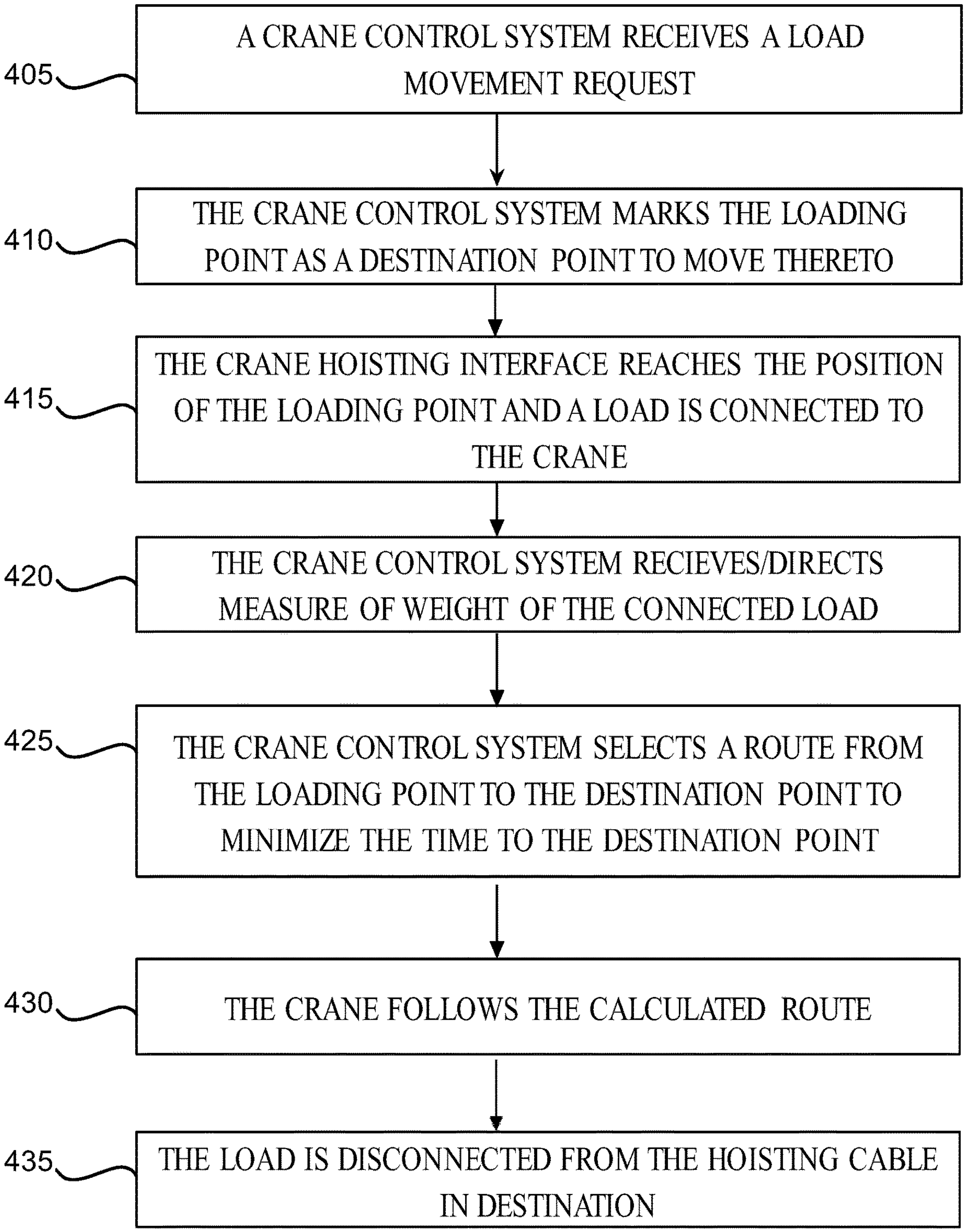
FIG. 10 is a block diagram of a method for moving a load by using a crane utilizing a crane control system, constructed and operative according to exemplary embodiments of the subject matter of the invention.

Reference is now made to FIG. 10. FIG. 10 is a block diagram of a method for moving a load by using a crane utilizing a crane control system, constructed and operative according to exemplary embodiments of the subject matter of the invention. In step 405, a crane control system receives a load movement request. The load movement request may be received from a user operating a user interface configured to send load movement request to the crane control system. The load movement request and loading point may be automatically identified by the system, the moment cable tension (arising from the initial hoisting of a connected load) is detected. In other embodiments, the load movement request may be received from a remote server. In some cases, the load movement request may comprise a loading point of a load and a destination point of the load. In some embodiments, the loading point and the destination point may be represented by global positioning system (GPS) coordinates. In other embodiments, the loading point and the destination point may be represented by location marks in a three-dimensional model of the crane area, for example a 3D model of a construction site. In other embodiments, the load movement request may comprise/define an obstruction-free corridor defined by a user. The obstruction free corridor may be defined as the space which the crane and/or load are allowed to move therein without limitation to the sway.

In step 410, the crane control system marks the loading point as a destination point for moving the crane hoisting interface (e.g., the hook) thereto. The crane control system is configured to calculate a route from the current position of the crane hoisting interface to the loading point. The current position of the crane (e.g., position of its hook) may be defined by the location of the jib, trolley and the cable of the tower crane. In some embodiments, the crane control system presents the calculated route to a crane tower operator, for example on a display device. The crane control system may be configured to prevent the operator from deviating from the calculated route. In other embodiments, the crane control system may alert the operator (as well as additional personnel), about each deviation from the calculated route presented thereto. In some embodiments, the crane control system is configured to autonomously control the crane through the calculated route.

When the crane loading interface reaches the loading point, the load is hooked up/connected to the cable, in step 415. The connection of the load may be done automatically or manually. Then, in optional step 420, the crane control system controls adequate measuring of the load (e.g., by suitable pressure gage coupled with the hoisting cable or hoisting mechanism) or receives the weight of the load from another source (e.g., entered manually by a user or from an external data feed).

In step 425, the crane control system calculates a route from the loading point to another destination point (for unloading). Contrary to current methods that are configured to prevent any load sway, the current method is configured to allow and control sway to optimize the route, by allowing maximal safe sway along the route. Nevertheless, the crane control system is further configured to bring the load to the destination point with a required and/or recommended sway limit as defined by a user or predefined for the parameters of the crane, load and environment. For example, reaching the destination point with a 1 meter radius of sway. In some embodiments, the calculated route comprises instructions for movements of more than one component of the crane, the velocity of each movement and the acceleration of each movement (e.g., rotation of the jib of a tower crane, travel of the trolley along the jib, or lifting/lowering of the hoisting cable). In some embodiments, the calculated route is configured to control the sway created during the movement (e.g., reducing sway by accelerating the driving components for restraining sway), and to calculate how to decelerate in order to reduce the sway upon arriving at the destination point. The allowed sway during the movement is calculated taking into account constrains in the operational zone (such as buildings and objects in the construction site) and other parameters regarding crane and load limitations.

Thus, the crane control system enables the crane operator to carry the load to its destination, without restricting of movement, or with minimal restriction of movement, which restriction, when conventionally applied along the entire route, would increase the time required to complete the transporting process.

Then, in step 430, the crane follows the calculated route, either by the crane operator operating the crane controls in accordance with the instructions of the route, or by a computer program operating the controls. When the crane reaches the destination point, the load is disconnected from the hoisting cable, in step 435.

Figure 11:
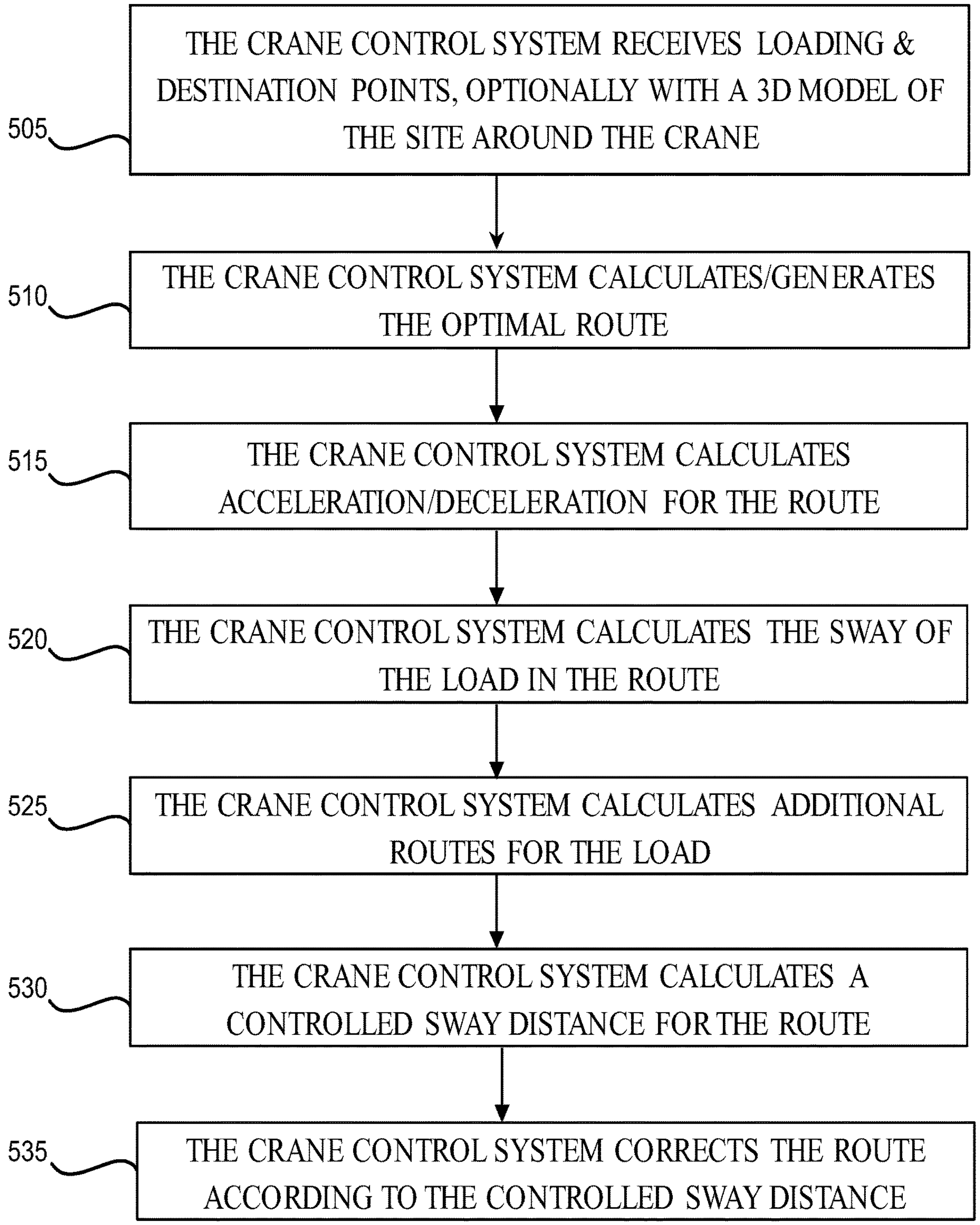
FIG. 11 is a block diagram of a method for calculating a route from a loading point to a destination point for a load by using a crane utilizing a crane control system, constructed and operative according to exemplary embodiments of the subject matter of the invention.

Reference is now made to FIG. 11. FIG. 11 is a block diagram of a method for calculating a route from a loading point to a destination point for a load by using a crane utilizing a crane control system, constructed and operative according to exemplary embodiments of the subject matter of the invention. In order to calculate a route, the crane system calculates the sway of the connected load under certain rules:

While the load is hoisted in the air, swaying of the load is allowed and a maximum radius of sway is defined at each point along the route such that the sway does not reach any obstacles and does not exceed the limits of the crane or load. Additionally, a safety distance may be defined by a user or predefined in the system. The safety distance is the distance between the far end point of the sway to the nearest object. For example, in case the route is 30 meters from an object, and the safety distance is defined as 10 meters around any such object, the allowed sway will be limited to have a 20 meters radius to prevent collision with the object. A safety margin can also be defined for the limits of the crane or load.

The sway allowed along the route should not put the crane stability at risk. For example, compromising crane stability may be directly caused by the sway radius being larger than the distance between the load and the crane tower (i.e., the load collides with the crane mast). Additional risk to the crane may be caused by a sway which will affect a large enough force on the structure or systems of the crane and unsettle the crane, which may lose stability and even topple down.

The load should reach the destination point with a minimal sway that does not exceed the limitation defined by a user, or predefined.

In some embodiments, the calculated route may be implemented automatically by a computer program controlling the crane controls. In other embodiments, the calculated route is presented to a crane operator for implementing the route. In such cases, the crane control system may implement an anti-deviation mechanism which will prevent the operator from deviating from the route. In some embodiments, the deviation prevention is made by stopping the load by ceasing crane movements. In some embodiments the anti-deviation mechanism may allow up to a predefined extent of deviation from the route before halting the movement In step 505, the crane control system receives a loading point and a destination point. In some embodiments, the crane control system receives the loading and the destination point as a 3D-model points (coordinates). In other embodiments, the crane receives obstruction free corridor boundaries whereby the route should be calculated inside the boundaries thereof.

In step 510, the crane control system calculates/generates the optimal route from the loading point to the destination point that will lead to the shortest travel time (or with the least energy consumption, or encumbered with the least crane-wear). The optimal route is defined as the route that either would take the shortest time to travel, or that will consume less energy/crane-wear. In some embodiments, the route comprises a series of movement segments, wherein each segment may comprise movement components in up to three axes, which may be executed simultaneously (rather than in series). In such cases, the movement segments are calculated considering the obstacles in the area, and in some embodiments the safety distance around the obstacles as defined in a received 3D model or defined by a user. In other embodiments, the route may be defined as the shortest route or a direct line from the loading point to the destination point.

In step 515, the crane control system further calculates acceleration/deceleration in 3 degrees of freedom schedule for the route. In some embodiments, a simple acceleration/deceleration schedule is determined for the entire route, e.g., acceleration phase through an initial route section, constant velocity phase through an intermediate route section, and deceleration phase through a final route section. In other embodiments, the acceleration/deceleration schedule is separately determined for each segment of the route, e.g., each segment features an acceleration phase through an initial segment section, a constant velocity phase through an intermediate segment section, and a deceleration phase through a final segment section. Without limitation to theory, the acceleration/deceleration determined for sections of the route or for sections of each segment of the route, determine the force and energy utilized by the driving components of the crane for achieving the desired acceleration/deceleration. In some embodiments, the calculation is made to lessen the amount of energy spent throughout the entire route. Such calculation may be subject to exclusion of decelerations dictated along the final section thereof and/or other sections by safety requirements, to prevent risking the crane or objects along the route, to bringing the load to the destination point at minimal sway required for safe unloading of the load (with a sway value defined by the user/predefined).

For example, if a plan of a route that should cross an area with no obstacles in a straight line 200 meters long is called for, the system would apply maximum acceleration during the first 100 meters, thereby creating a load sway, continue with a constant velocity for the next 50 meters allowing the reduction of sway, and decelerate with an intense deceleration in the last 50 meters, thereby altering the sway, which will be actively reduced to 1 meter radius at the destination Reduction of sway in the last 50 meters section may also involve further maneuvers other than simple deceleration, e.g., initial lifting for shortening cable, counter accelerations of jib/trolley, etc.).

In step 520, the crane control system simulates the calculated route in step 510 with the acceleration/deceleration values determined in step 515 and calculates the load sway that will be generated in each point of the route. In some embodiments, the load sway is calculated for each degree of freedom, thus creating 6 degrees of freedom sway components. In case the route comprises several segments, the sway in each segment is calculated taking into consideration the allowed sway which is safe for that segment.

In some embodiments, the method further includes step 525, in which the crane control system calculates additional alternative routes for allowing comparison of the calculated routes and selecting an optimal route among them, which is the route in which the load reaches the destination point in shortest time/least energy/least wear, relative to the other alternative calculated routes.

In step 530, the crane control system calculates diversified sway span for the route. The diversified sway span defines at least one segment/section in the route in which the sway is limited by a particular limit. The sway may be limited in a different manner for different loads, respectively, or for different routes. For example, the diversified sway span can divide the route/segment into two sections—the first section in which the sway is virtually unlimited (safety limit cannot be overpassed). and the crane control system may create a route to maximize the speed, irrespective of the sway, and a second section in which the sway is limited. For example, in case the distance between the loading point to the destination point is 75 meters, the sway may be unlimited for 62 meters and limited for 13 meters. The length of the second section, in which the sway is limited, may be calculated according to the load's weight, 3D model of the area and the like.

In step 535, the crane control system corrects the route according to the controlled sway distance.

Figure 12:
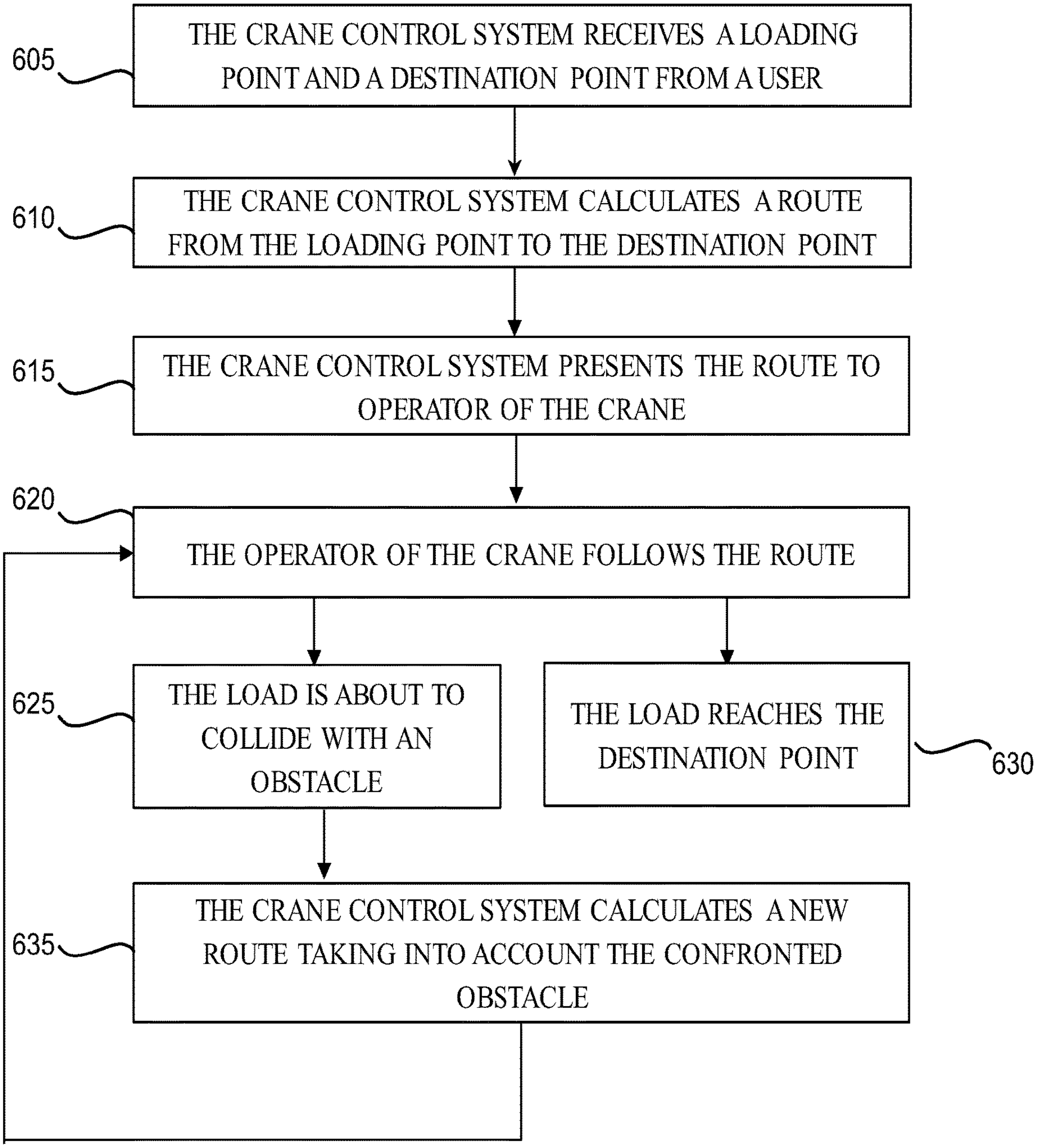
FIG. 12 is a block diagram illustrating an additional method for calculating a route from a loading point to a destination point for a load by using a crane utilizing a crane control system, according to exemplary embodiments of the subject matter of the invention.

Reference is now made to FIG. 12. FIG. 12 is a block diagram illustrating an additional method for calculating a route from a loading point to a destination point for a load by using a crane utilizing a crane control system, constructed and operative according to exemplary embodiments of the subject matter of the invention. In step 605, the crane control system receives a loading point and a destination point. In some embodiments, the system has no predefined data about obstacles in the operational zone. In such cases, the 'operator' of the crane (either a software or a person) may operate additional tools for finding obstacles along the path, or to operate tools that would prevent collision.

In step 610 the crane control system calculates a path from the loading point to the destination point. in some embodiments, the route is determined as a straight line between the two points. In such cases, the route may be split for example into two section:

1) a free sway section, wherein the sway is not controlled as long as the sway does not endanger crane stability or recognized obstacles; and
2) a controlled sway section, wherein at this portion the sway should decrease in order to bring the load to the destination point with the predetermined value of sway.

The length of each one of the two sections, the acceleration graph in 3 degrees of freedom, is calculated based on the length of the route, the specification of the crane and the load information.

Since any deviation from the route may change the span and direction of the load sway, the route is defined to maintain a safety distance to known obstacles, and/or to stop moving the load and recalculate a new route when an object is found to be within that safety distance from the load.

In step 615 the crane control system presents the route to an operator of the crane (either a person or a computer program configured to operate the crane). In step 620 the operator of the crane follows that route. In some embodiments, the route is divided to separate sections where each load movement component (e.g., jib, trolley, hoist) has different instructions, such as for acceleration and direction. For example, an instruction for a section of the route would be "keep straight and maintain speed for the next 50 meters, maximum sway allowed is 30 meters in directions X-Y".

In step 620, the operator of the crane follows the route until either the load reaches the destination point, as in step 630, or the load is about to hit an obstacle, as in step 625. In step 620, the operator of the crane follows the route without confronting obstacles on the way and reaches the destination point, with a sway that was predefined by a user. In step 625, the operator receives indication that that load is about to confront an obstacle, which in some embodiments, in some cases may not have been taken into account in the calculated route. In such cases the operator of the crane deviates from the route in order to stop a possible collision of the swaying load with the obstacle. The deviation may occur manually by the operator by changing the speed or course of the load or by collision prevention automatic systems, that are known in the art.

In step 635, the crane control system recalculates the route taking into account the confronted obstacle. Then, the crane control system presents the newly calculate route to the operator for commencement thereof (step 620). In some embodiments, the crane control system includes machine learning capabilities. In such cases, if an obstacle is re-confronted in short periods of time, the crane control system may assume that there is a large obstacle in that path, will store that data in the memory thereof, and will calculate the route accordingly (step 610). This new obstacle will be taken into account by the system until the system is updated that the obstacle has moved.

Figure 13:
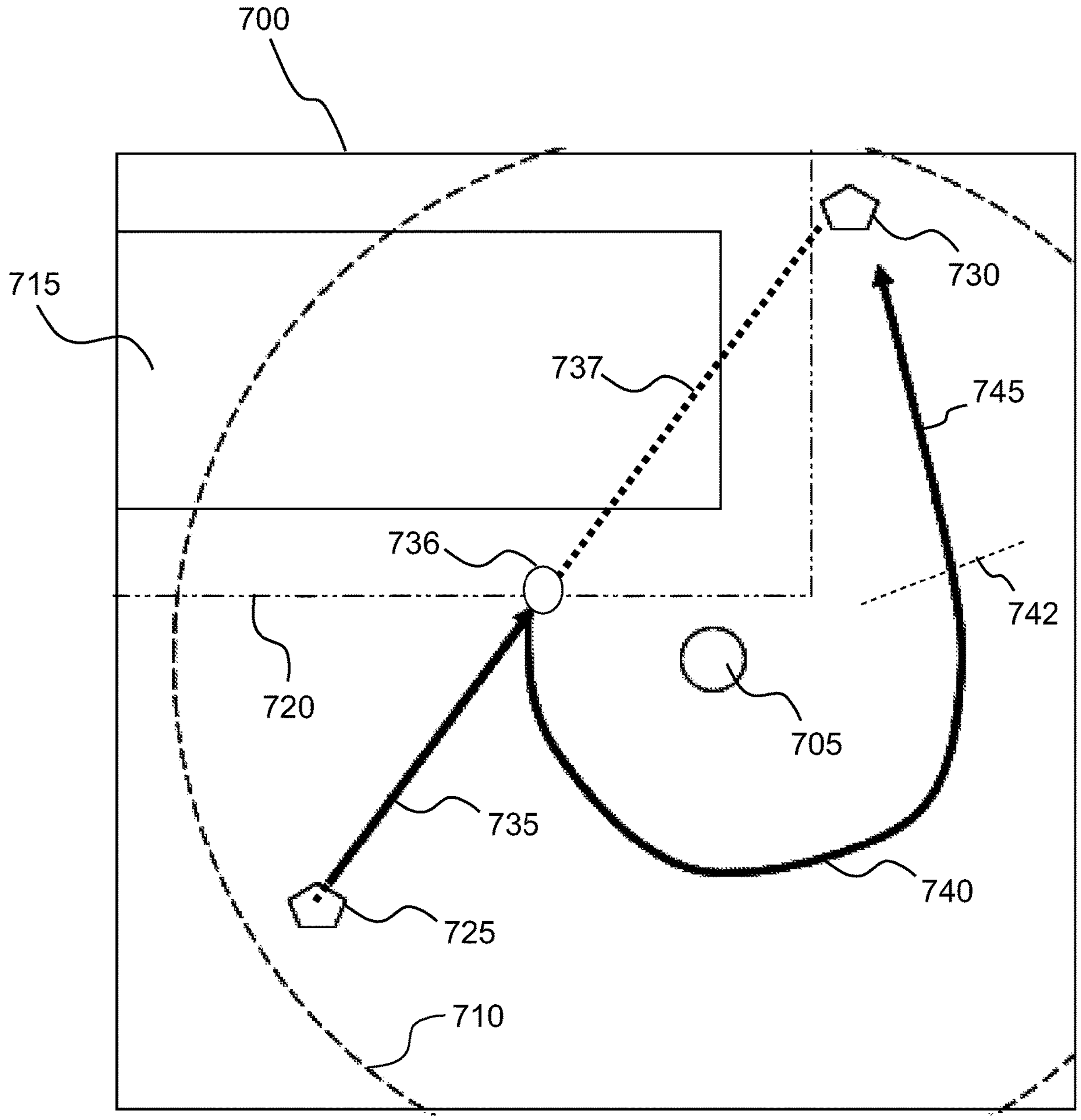
FIG. 13 schematically illustrates a top view of a crane surrounded by crane operational zone and of a planned route for transporting a load, constructed and operative according to exemplary embodiments of the subject matter of the invention.

Reference is now made to FIG. 13. FIG. 13 schematically illustrates a top view of a crane surrounded by a crane operational zone and of a planned route for transporting a load, constructed and operative according to exemplary embodiments of the subject matter of the invention. FIG. 13 shows an area 700, such as a construction site. In, area 700 a crane 705 is disposed, and is surrounded by a crane operational zone 710, which is the area in which the crane can transport load. A construction site 715 is encumbered by a safety distance, below which a collision with the load is possible, and is represented by dashed borderline 720, which surrounds construction site 715. In some embodiments, the safety distance is calculated based on the weight of the transported load and/or the maximal allowed load sway.

Crane 705 is to be utilized for transporting a load from a loading point 725 to a destination point 730. Since there is no additional data presented to the crane control system, the crane control system calculates a first route 735 directly from loading point 725 to a destination point 730. Then, the crane control system presents the calculated route to the operator for commencement thereof. During the first section of route 735, the load is allowed to generate sway, and no power or time is spent on preventing the generation of that sway. Following the route, the load reaches a point 736 along route 735, and encountering safety distance borderline 720. The crane control system identifies that the load is in about to cross safety distance borderline 720 of construction site 715, stops movement of the load, and recalculates a circumventing second route 740, instead of the unavailable second section 737 of first route 735.

For bringing the load to the destination point without crossing borderline 720 of the collision unsafe zone, the crane control system guides crane 705 to maneuver the load via second path 740. Along second path 740, the load is allowed to generate sway, and no power nor time is spent on preventing the generation of that sway. Upon reaching a calculated distance from the destination point, represented by dotted line 742, the crane control system starts to limit the sway along a route arrival section 745 for reducing the sway. Along route arrival section 745, the crane controls the deceleration of the speed of the load, and optionally applies sway restraining maneuvers for bringing the load to destination point 730 with only a predetermined sway or no sway, as required for its unloading.

Figure 14:
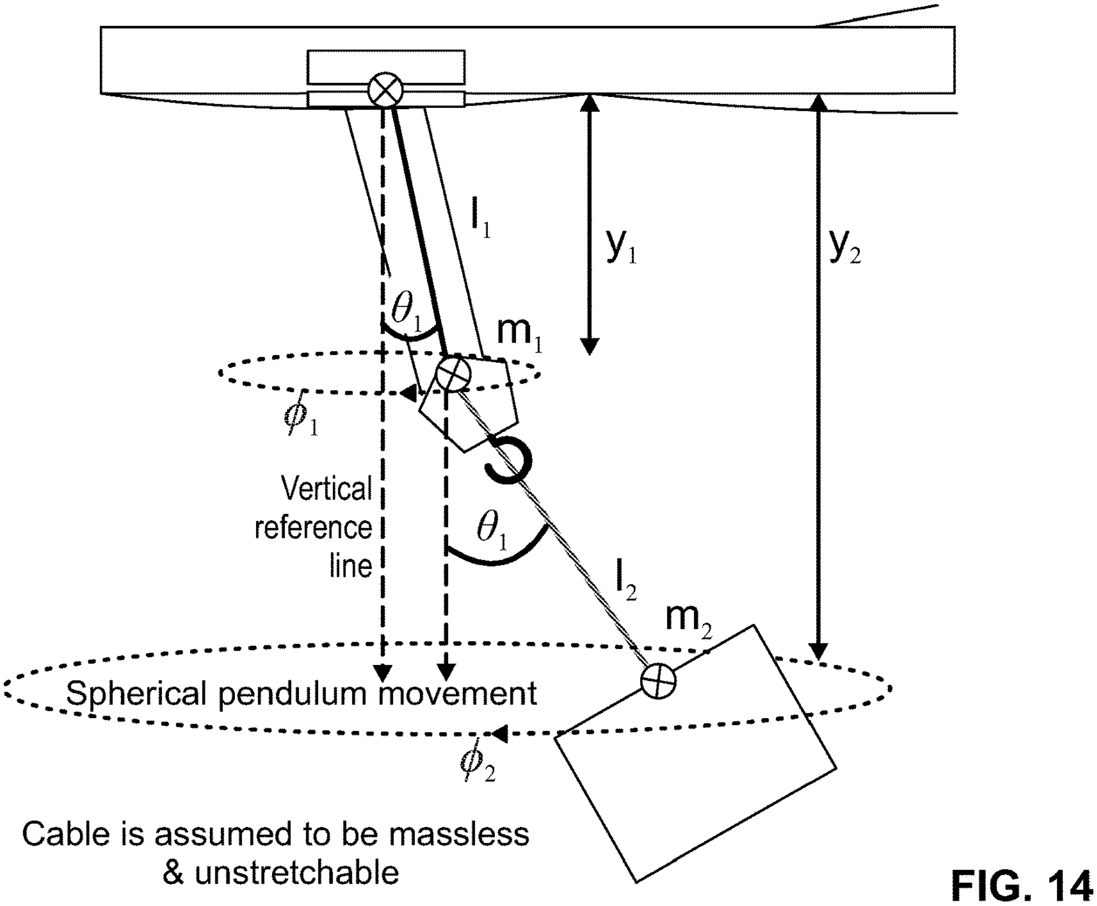
FIGS. 14 to 22 illustrate configurations for exemplary calculations for dampening sway, and load trajectory planning.
Figure 15:
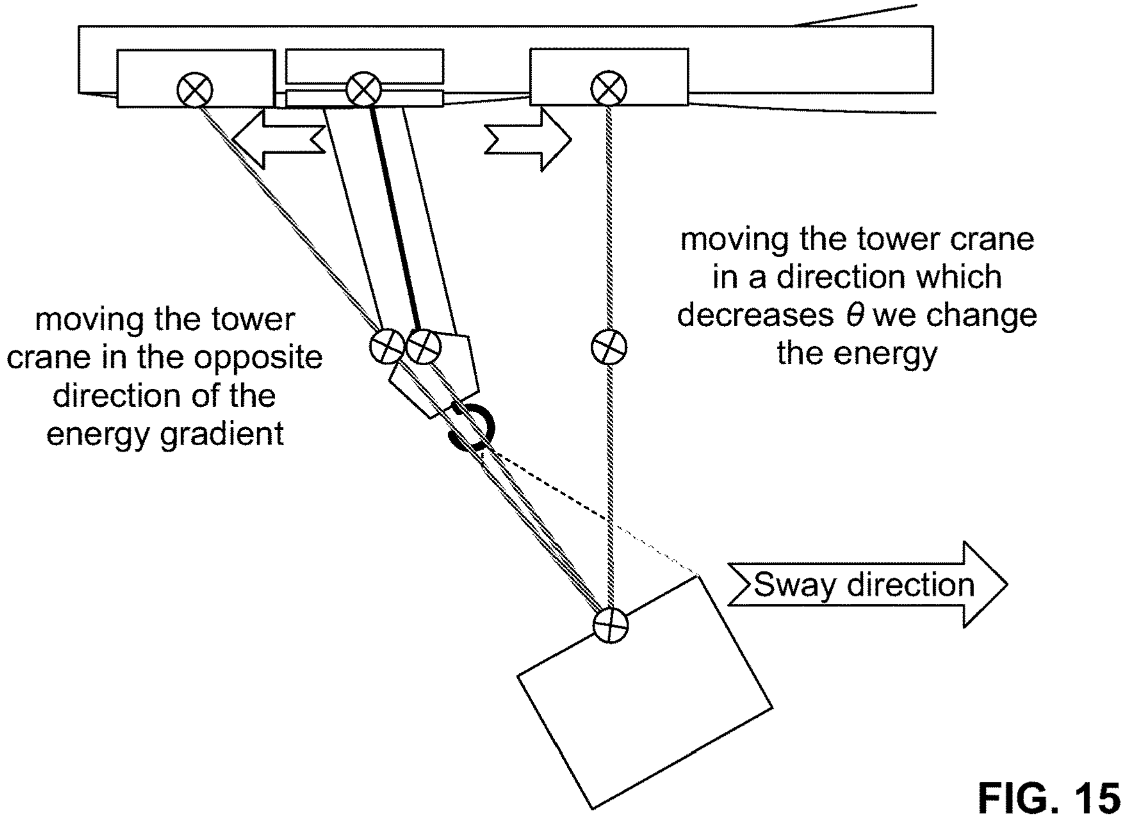

Reference in now made to FIGS. 14 to 22, which illustrate configurations for exemplary calculations for dampening sway, and load (also referenced as "payload") trajectory planning. A typical hoist of a typical tower crane involves the hanging of a load on a cable attached to the crane hook/hook-assembly, which hangs by a further cable/cable arrangement on the trolley, and therefore poses a double pendulum situation, as is illustrated in FIGS. 14 and 15. The workspace of the pendulum is the geometrical set of points that can be occupied by the tower crane and the load at any point of time.

Payload Model:

The model of a payload suspended from the tower crane is mathematically formulated using a spherical pendulum equation. Euler-Lagrange equation may be used in order to formulate the equation of motion. The Lagrangian is defined as:

$$L = T - U = \frac{1}{2}mr^2\left(\dot{\theta}^2 + \sin\theta\dot{\phi}^2\right) - (mgr(1 - \cos\theta))$$

The Euler-Lagrange equation is:

$$\frac{d}{dt}\left(\frac{\partial L}{\partial \dot{q}}\right) - \frac{\partial L}{\partial q} = 0$$

Here q=[θ,ϕ] is used and it is assumed that no external forces are applied. So, the equations of motion are:

$$\frac{d}{dt}(mr^2\dot{\theta}) - mr^2\sin\theta\cos\theta\dot{\phi}^2 + mgr\sin\theta = 0$$

and $$\frac{d}{dt}(mr^2\sin^2\theta\dot{\phi}) = 0$$

Let us denote by α, c, r the tower crane angle, the cart's position and wire length respectively. The Cartesian coordinates of the trolley position on the crane are:

$$[x_c, y_c)] = [c\cos\alpha, c\sin\alpha]$$

The payload's coordinates are:

$$[x_p, y_p] = [x_c, y_c] + [r\sin\theta\cos(\phi+\alpha), r\sin\theta\sin(\theta+\alpha)]$$

Here ϕ is measured from the crane's arm.

Damping Pendulum Motion:

Damping the pendulum sway can be carried out in two ways:

1. Calculating the pendulum energy and moving the tower crane degrees of freedom (α and c) in the opposite direction of the energy gradient, at every time-step, until reaching a relaxed configuration:

$$E = T + U = mgr(1 - \cos\theta)\frac{1}{2}m(\dot{x}_p + \dot{y}_p)^2$$

$$\nabla E = \left[\frac{\partial E}{\partial c}\ \frac{\partial E}{\partial \alpha}\ \frac{\partial E}{\partial r}\right]$$

2. Let us assume for simplicity a planar pendulum. At the maximum tilt height, the mass energy takes the form:

$$E = mgl(1 - \cos(\theta))$$

If we move the cart at this position in a direction which decreases θ we change the energy to:

$$E = mgl(1 - \cos(\theta')) + \frac{1}{2}mV_y^2$$

Here $V_y$ is calculated as a free fall from l(1−cos (θ)) to l(1−cos(θ'))

It is noted that the moment around the cart at the static position (calculated by M=mgl sin(θ)) decreases at θ' resulting in a decrease in the tilt's angle. The energy is that case is passed to the crane's wire.

Crane's Dynamic Response:

During lifting of a load, oscillations occur in the crane's structure due to its elasticity. There are three main oscillations—mast twist, mast bend and arm bend. The crane's dynamic response can be controlled using the crane's degrees of freedom. The dynamic response of the crane structure is proportional to the amplitude of the pendulum angle, regardless of the length of the pendulum.

Figure 16:
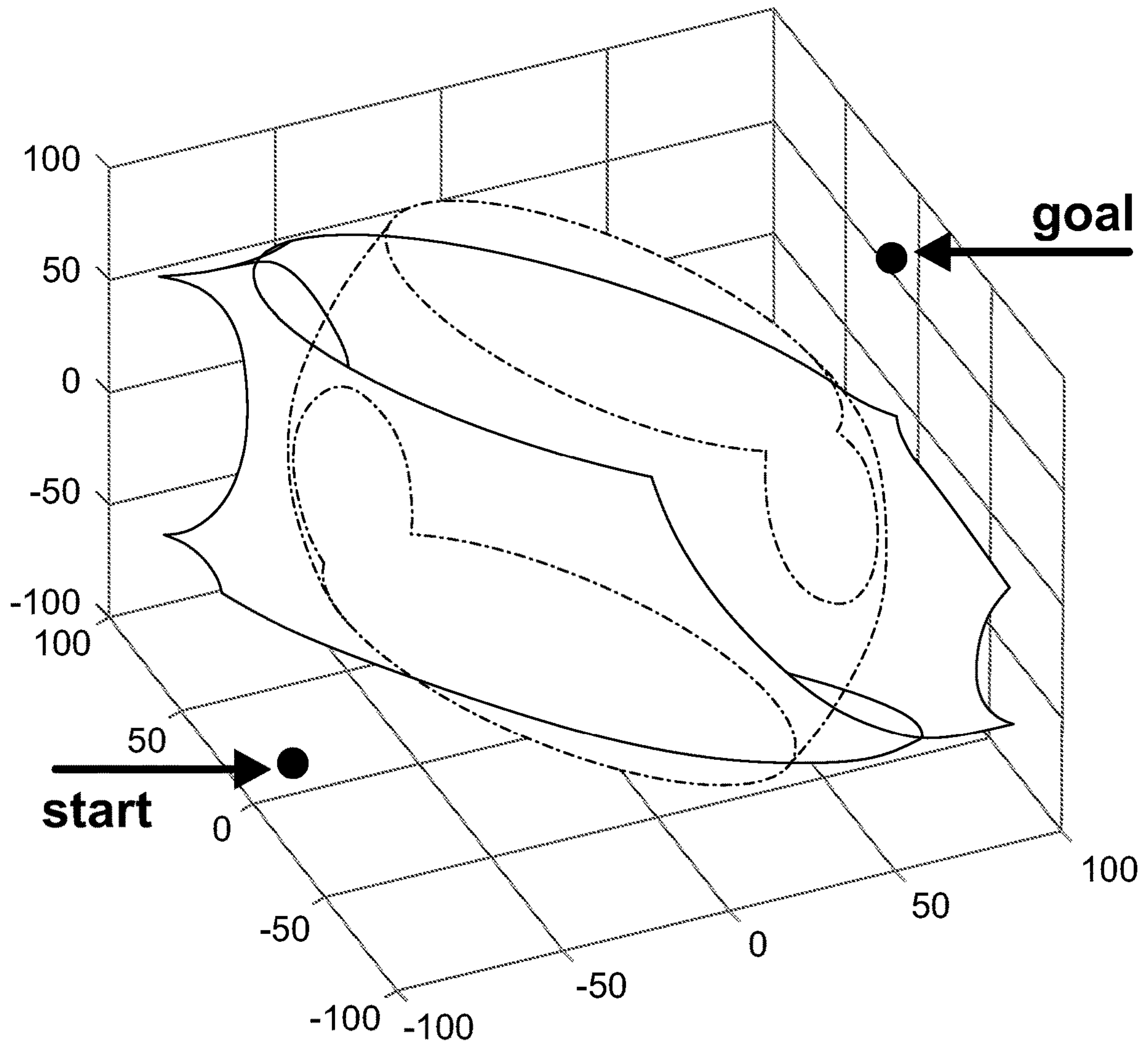

Tower Crane Mechanical Limitations—Motors Torque:

The crane motors' torque and speed are limited. These limitations are modeled as physical "obstacles" in the configuration space C (FIG. 16). New obstacles are defined as the level set where the torque and speed equal their respective thresholds. FIG. 16 exemplifies a C-space of a serial planar robot with two manifolds, demonstrating mechanical limitations modelling. One represents the boundary of the configurations where the mechanism collides with the workspace real-world obstacle and the other represents the torque threshold.

Structural Force:

an additional limitation that needs to be addressed is the maximum structural force the body of the crane can withstand without the risk of collapsing. The payload sway force on the wire $f = m\omega^2 l$ is added to the payload's weight. This limits the mass of the payload when motion which includes sways.

Figure 17:
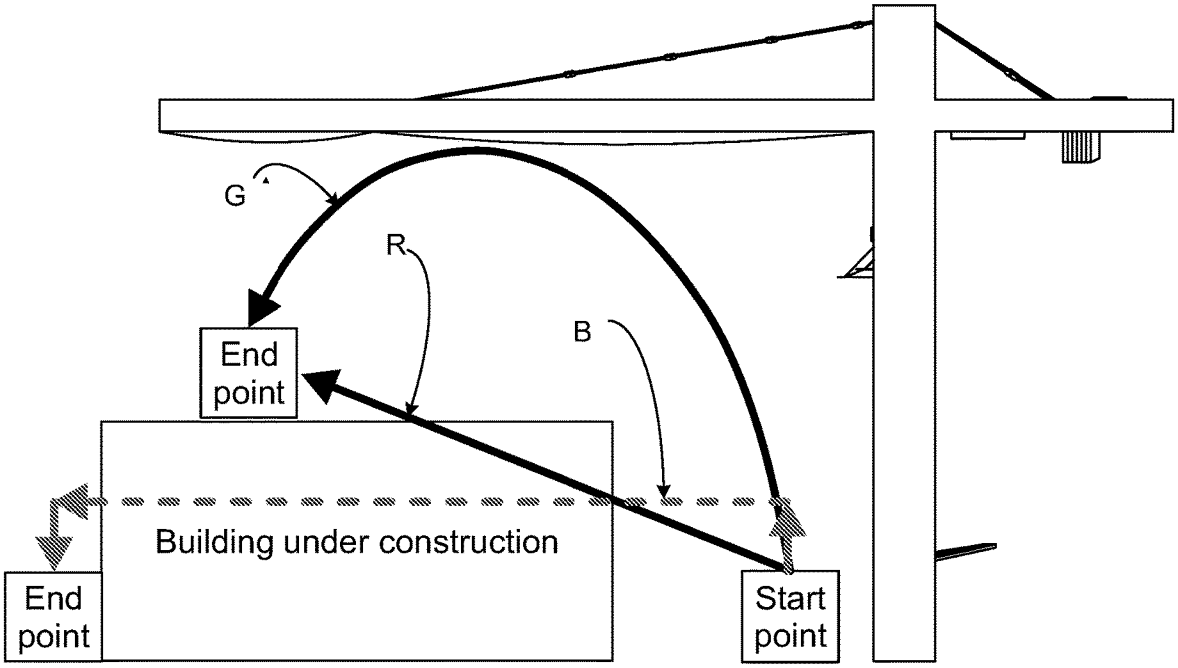

Initial Trajectory Planning:

Reference is now made to FIG. 17, which is a side view of exemplary crane and building with several transport paths. When planning the motion of a spatial moving body six parameters may be considered: three of the body's center of gravity (CG) and three angles corresponding to the body's movement about yaw, pitch and roll axes. For the crane each of its three degrees of freedom may be considered, thus the crane's configuration space is (α,c,r). The majority of load movements include an obstacle (one or more) interference in the payload's straight path from an initial point A to a goal point B (FIG. 17):

An "obstacle" can be an upper edge of a body from which the load should be kept with sufficient clearance. Accordingly, direct trajectory (arrow R) is not valid, requiring an alternative trajectory (arrow G)

An "obstacle" can also be a body above which the crane cannot maneuver the load, thereby requiring the load to move around the obstacle (dashed arrow B)

Figure 18:
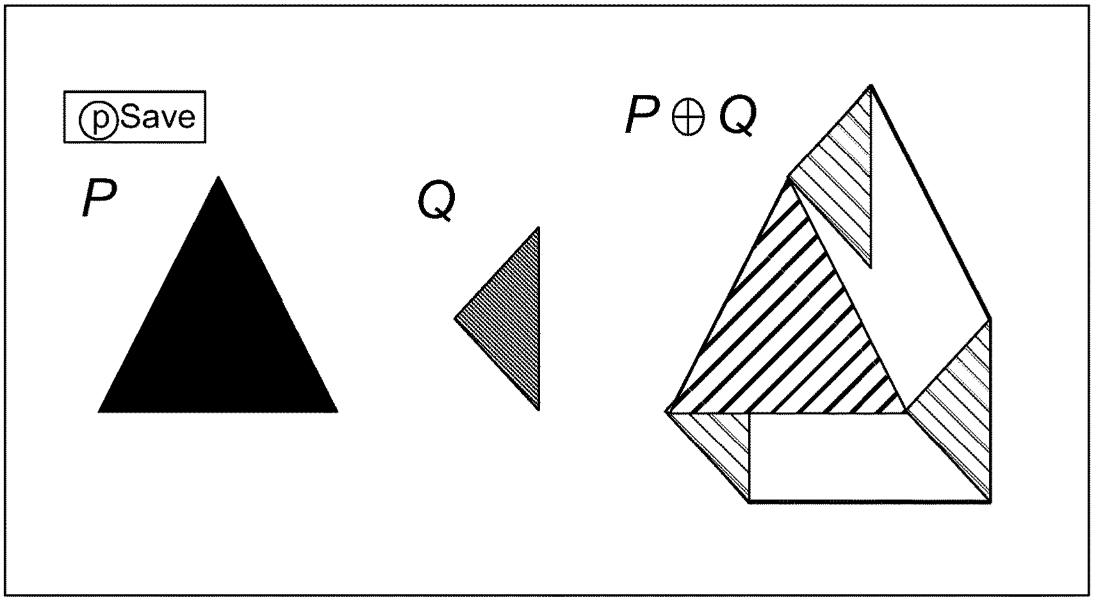
Figure 19:
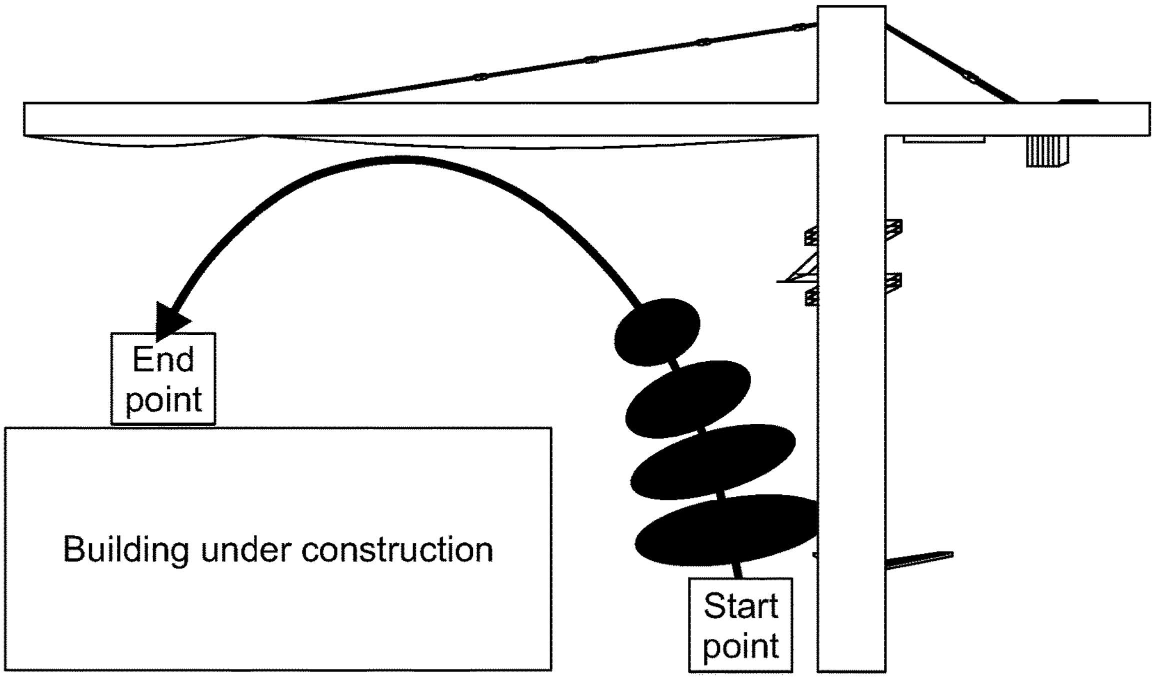

One may use Minkowski sums as an effective geometric technique to fatten objects, in a dynamic and uncertain space, for providing effective and safe motion calculation. When dealing with a polygonal mechanism in spaces with polygonal obstacles—the space fattens each of the obstacles by taking the Minkowski sum (maximum body geometry) of the shape of the body, as is illustrated in FIG. 18, which illustrates fattening of obstacles P and Q by taking their Minkowski sum P⊕Q.

Calculating the Minkowski sum is performed by using the pendulum movement calculation. This provides a simple and fast trajectory of moving an object point from the starting point to the goal point, using a standard shortest-path algorithm. The Minkowski sum (MS) method may be used so the problem of the payload's sway takes into account all dimensions of the obstacle by "inflating" the obstacle. If a circular sway is assumed, the MS may be used with the obstacle geometry and a disc. This enables maximum safety in the payload's motion and a real time trajectory calculation.

After providing an initial trajectory, the dynamics of the motion is calculated. In this case the payload's position in space may have some different shapes rather than a disc. At this stage, the trajectory is recalculated, based on a new, and most likely, reduced body geometry, represented by the series of reducing ellipsoids in FIG. 19, which is a side view demonstrating ellipsoidal effective positioning of a load along a transfer path. This enables controlling the payload's speed and sway, such that the payload sway in the Minkowski sum will take the shape of an ellipse rather than a disc.

Here it is assumed that the crane moves the payload autonomously. If the motion of the crane stops or diverts from the trajectory (in case of emergency stop or the case of human takeover), this method is used again to provide the operator with a real-time safe and the most effective trajectory.

Full Trajectory Roadmap.

Figure 20:
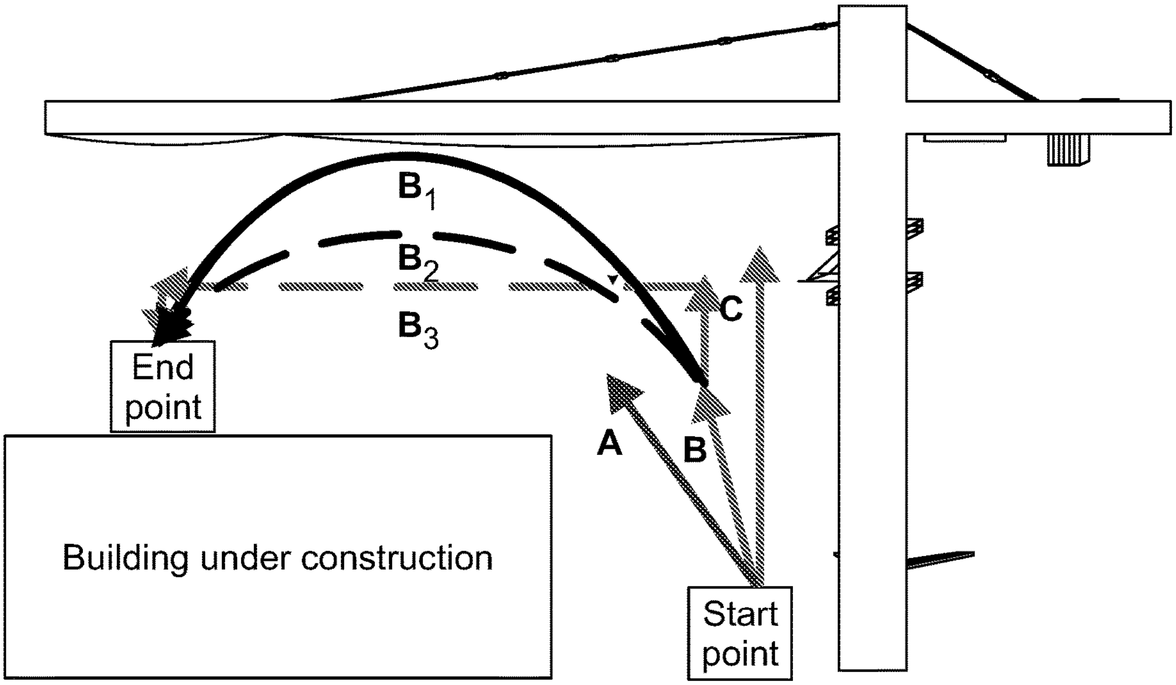

Reference is now made to FIG. 20, which is a side view illustrating several randomly sampled intermediate load transfer configurations, furnished according to the invention. Sampling-based algorithms are used to build a road-map between the start point and goal point, for crane configurations passing through several intermediate configurations, which are randomly sampled.

Figure 21:
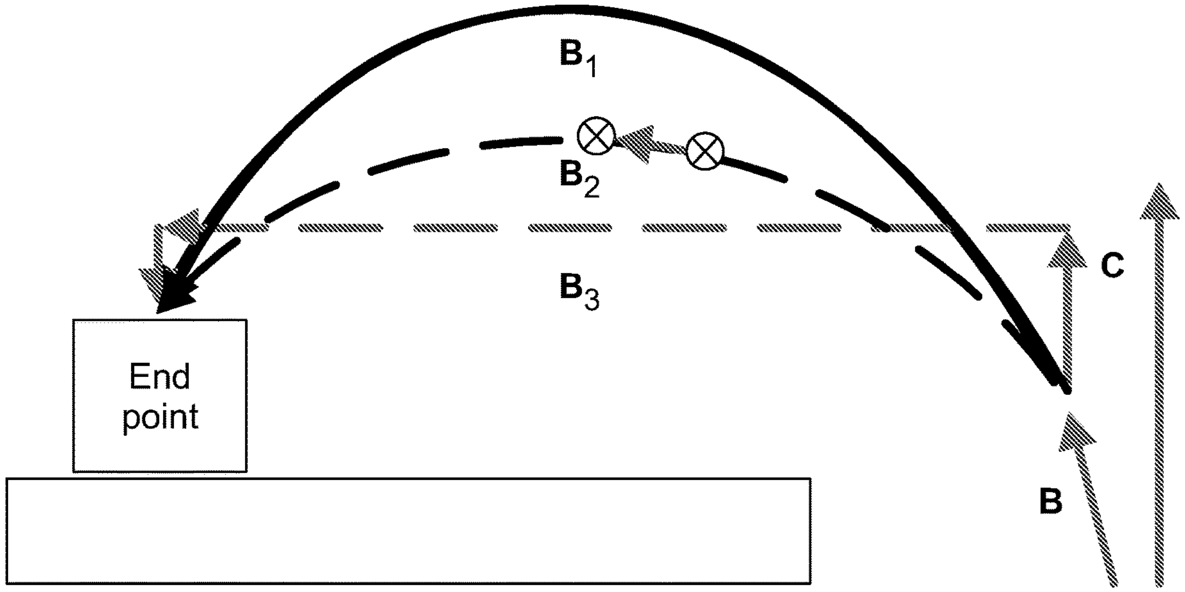

Each set of configurations (change from configuration A to B) is checked for connectivity (valid maneuver) as is shown in FIG. 21, which is a zoom-in side view of FIG. 20. This is done by using a "crawl" approach on the obstacle boundary rather than traversing a straight path (FIG. 20). Each connectivity will be checked in several speeds for optimizing the solution. Maneuver 6 degrees of freedom avoids configurations, which exceed the pre-defined maximal abilities of the crane and avoid collisions with obstacles as well as self-collisions.

Optimal Trajectory Maneuver.

Figure 22:
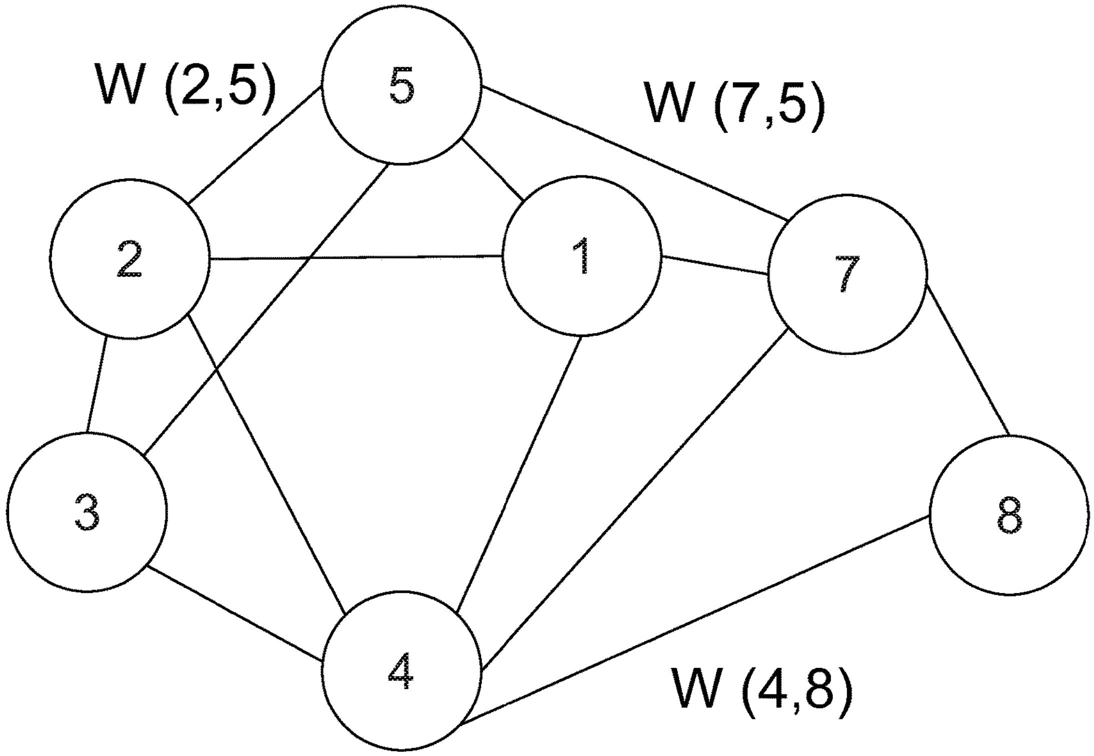

For each set of valid configuration changes, cost of configuration change (time, energy, mechanical stress . . . ) is calculated. This is done by integrating the predefined weight function. This results with a weighted abstract graph. The algorithm proceeds with a path search on the graph from the start point to the goal point of the crane's configurations while minimizing the total path cost. Finding the optimal path is solved as a problem in graph theory. The most common algorithm is Dijkstra, as is illustrated in FIG. 22, which is Dijkstra diagram used in graph theory problem solving.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. System for transporting a load along a transport route from an uploading engagement point to a downloading disengagement point, wherein the load is hoisted and kept suspended along the route, comprising:

a bridge;

a hoisting module hanging down from said bridge and operative for engaging, lifting, suspending, depressing/bringing down, and disengaging the load;

a haul mechanism comprising at least one of:

a bridge displacer operative for displacing said bridge; and a trolley operative for travelling along said bridge, wherein said hoisting module hangs from said trolley; and a resource optimizer for determining an optimal-resource consumption route from said uploading engagement point to said downloading disengagement point which is conducted by respective activation of said hoisting module and/or said haul mechanism, including determining respective parameters of acceleration, deceleration, and sway-restraint maneuvers along said optimal-resource consumption route, wherein said optimal-resource consumption route is segmented into at least one segment, wherein a respective segment safe-travel sway-span and a respective segment hand-over sway-span are predetermined for each of said at least one segment, and wherein each of said at least one segment comprises an initial acceleration section in which a dangling load is allowed to sway up to said respective segment safe-travel sway-span, and a final deceleration section, wherein sway of the dangling load is restrained at a latter part of the respective segment for reaching said respective segment hand-over sway-span at the end of said at least one segment, wherein said resource comprises at least one of:

time;

energy;

system-wear any combination of said time, energy, and system-wear; and any weighted combination of said time, energy, and system-wear, wherein said resource optimizer is operative for:

determining segment minimum resource consumption routes by determining for each of said at least one segment, a segment minimum resource consumption route including determining respective parameters of acceleration, deceleration, and sway-restraint maneuvers along said at least one segment, per said respective segment safe-travel sway-span and said respective segment hand-over sway-span;

combining possible minimum resource consumption routes from said segment minimum resource consumption routes; and selecting an optimal resource consuming route out of said possible minimum resource consuming routes, and wherein transporting of the load from said uploading engagement point to said downloading disengagement point is conducted pursuant to said optimal resource consumption route including its respective determined parameters.

2. The system for transporting a load of claim 1, wherein said latter part of the respective segment in which sway of the dangling load is restrained for reaching said respective segment hand-over sway-span at the end of said at least one segment, comprises at least one of:

the end of said segment;

at least a latter portion of said final deceleration section;

said final deceleration section and at least a latter portion of an intermediate non-accelerating/decelerating section; and said final deceleration section, an intermediate non-accelerating/decelerating section, and at least a latter portion of said initial acceleration portion.

3. The system for transporting a load of claim 1, wherein said transport route comprises a 3-dimensional route.

4. The system for transporting a load of claim 1, wherein said parameters of acceleration and deceleration are determined in 3 degrees of freedom.

5. The system for transporting a load of claim 1, wherein sway of the dangling load at a latter part of the respective segment is actively restrained, by application of anti-sway maneuvers.

6. The system for transporting a load of claim 1, further comprising a controller for controlling the transport of the load from said uploading engagement point to said downloading disengagement point conducted pursuant to said optimal resource consumption route, by controlling the respective determined parameters there along.

7. The system for transporting a load of claim 6, wherein said controller is further configured to control anti-sway maneuvers for actively restraining sway of the load.

8. The system for transporting a load of claim 1, wherein said bridge displacer is configured to displace said bridge according to at least one of:

a horizontal translation;

a vertical translation;

a horizontal rotation;

a vertical rotation; and any combination of the above.

9. The system for transporting a load of claim 1, comprising apparatus featuring said bridge, hoisting module, haul mechanism, bridge displacer, and/or trolley, selected from the list of:

a crane;

a tower crane;

a rotary crane;

an overhead crane;

a gantry crane;

a luffing crane; and a telescopic crane.

10. Method for transporting a load along a transport route from an uploading engagement point to a downloading disengagement point, wherein the load is hoisted and kept suspended along the route, comprising:

providing a transport system, comprising:

a bridge;

a hoisting module hanging down from said bridge and operative for engaging, lifting, suspending, depressing/bringing down, and disengaging the load;

a haul mechanism comprising at least one of:

a bridge displacer operative for displacing said bridge; and a trolley operative for travelling along said bridge, wherein said hoisting module hangs from said trolley;

optimizing resources by determining an optimal-resource consumption route from said uploading engagement point to said downloading disengagement point by respective activation of said hoisting module and/or said haul mechanism, including determining respective parameters of acceleration, deceleration, and sway-restraint maneuvers along said optimal-resource consumption route, wherein said optimal-resource consumption route is segmented into at least one segment, wherein a respective segment safe-travel sway-span and a respective segment hand-over sway-span are predetermined for each of said at least one segment, and wherein each of said at least one segment comprises an initial acceleration section in which a dangling load is allowed to sway up to said respective segment safe-travel sway-span, and a final deceleration section, and restraining of the sway of the dangling load is conducted at a latter part of the respective segment for reaching said respective segment hand-over sway-span at the end of said at least one segment, wherein said resource comprises at least one of:

time;

energy;

system-wear any combination of said time, energy, and system-wear; and any weighted combination of said time, energy, and system-wear, wherein said optimizing resources comprises:

determining segment minimum resource consumption routes by determining for each of said at least one segment, a segment minimum resource consumption route, including determining respective parameters of acceleration, deceleration, and sway-restraint maneuvers along said at least one segment, per said respective segment safe-travel sway-span and said respective segment hand-over sway-span;

combining possible minimum resource consumption routes from said segment minimum resource consumption routes; and selecting an optimal resource consuming route out of said possible minimum resource consuming routes; and transporting the load from said uploading engagement point to said downloading disengagement point pursuant to said optimal resource consumption route, including its respective determined parameters.

11. The method for transporting a load of claim 10, wherein said latter part of the respective segment in which sway of the dangling load is restrained for reaching said respective segment hand-over sway-span at the end of said at least one segment, comprises at least one of:

the end of said segment;

at least a latter portion of said final deceleration section;

said final deceleration section and at least a latter portion of an intermediate non-accelerating/decelerating section; and said final deceleration section, an intermediate non-accelerating/decelerating section, and at least a latter portion of said initial acceleration portion.

12. The method for transporting a load of claim 10, wherein said transport route comprises a 3-dimensional route.

13. The method for transporting a load of claim 10, wherein said determining respective parameters of acceleration and deceleration comprises determining said parameters in 3 degrees of freedom.

14. The method for transporting a load of claim 10, wherein said restraining of the sway of the dangling load comprises actively restraining sway, by applying anti-sway maneuvers.

15. The method for transporting a load of claim 10, wherein said procedure of transporting comprises controlling, by a controller, the transport of the load from said uploading engagement point to said downloading disengagement point, pursuant to said optimal resource consumption route, by controlling the respective determined parameters there along.

16. The method for transporting a load of claim 15, wherein said controlling further comprises controlling, by said controller, anti-sway maneuvers for actively restraining sway of the load.

17. The method for transporting a load of claim 10, wherein said respective activation of said haul mechanism comprising displacing said bridge by said bridge displacer according to at least one of:

a horizontal translation;

a vertical translation;

a horizontal rotation;

a vertical rotation; and any combination of the above.

18. The method for transporting a load of claim 10, wherein said bridge, hoisting module, haul mechanism, bridge displacer, and/or trolley form part of apparatus selected from the list of:

a crane;

a tower crane;

a rotary crane;

an overhead crane;

a gantry crane;

a luffing crane; and a telescopic crane.

* * * * *